United States Patent [19]
Renfrew et al.

[11] Patent Number: 5,703,215
[45] Date of Patent: Dec. 30, 1997

[54] WATER-SOLUBLE DYES WHICH ARE POLYMERIZABLE CONTAINING MOLECULES WHICH CONTAIN A NUCLEOPHILIC GROUP AND AN ELECTROPHILIC GROUP

[75] Inventors: Andrew Hunter Morris Renfrew, Lancashire; Andrew Paul Shawcross, Manchester, both of England

[73] Assignee: Zeneca Limited, London, England

[21] Appl. No.: 436,822

[22] Filed: May 30, 1995

Related U.S. Application Data

[62] Division of Ser. No. 158,220, Nov. 29, 1993, Pat. No. 5,474,580.

[30] Foreign Application Priority Data

Nov. 27, 1992 [GB] United Kingdom ............... 9224909
Jun. 14, 1993 [GB] United Kingdom ............... 9312205

[51] Int. Cl.$^6$ .................... C09B 62/503; C09B 62/51; C09B 29/08; D06P 1/384; D06P 3/26
[52] U.S. Cl. .................... 534/642; 534/640; 534/641; 534/643; 534/134; 534/140; 544/97; 552/225; 106/22 R; 106/23 K
[58] Field of Search ............... 534/642, 640, 534/641, 643; 540/134, 140; 552/225; 544/99

[56] References Cited

U.S. PATENT DOCUMENTS

| | | | |
|---|---|---|---|
| 2,157,725 | 5/1939 | Zerweck et al. | 534/642 X |
| 2,670,265 | 2/1954 | Heyna et al. | 534/642 X |
| 3,232,691 | 2/1966 | Wilhelm et al. | |
| 3,313,799 | 4/1967 | Noll | 534/642 X |
| 3,557,048 | 1/1971 | Wilhelm et al. | |
| 3,655,642 | 4/1972 | Meininger et al. | 534/642 |
| 3,859,271 | 1/1975 | Sugiyama et al. | 534/642 |
| 3,900,510 | 8/1975 | Fuchs et al. | 534/642 X |
| 3,939,142 | 2/1976 | Fleckenstein | 534/642 X |
| 3,975,370 | 8/1976 | Kullman et al. | 534/642 X |
| 3,987,026 | 10/1976 | Koller et al. | 534/642 X |
| 3,998,805 | 12/1976 | Koller et al. | 534/642 X |
| 4,101,269 | 7/1978 | Champenois . | |
| 4,132,841 | 1/1979 | Champenois . | |
| 4,148,791 | 4/1979 | Altermatt | 534/642 |
| 4,198,204 | 4/1980 | Von der Eltz et al. . | |
| 4,283,196 | 8/1981 | Wenghoefer et al. | 8/531 |
| 4,523,925 | 6/1985 | Scheibli . | |
| 4,763,371 | 8/1988 | Parton . | |
| 4,855,411 | 8/1989 | Thompson et al. . | |
| 5,003,053 | 3/1991 | Springer et al. . | |
| 5,108,460 | 4/1992 | Hines et al. . | |
| 5,207,801 | 5/1993 | Aeschlimann et al. . | |
| 5,223,000 | 6/1993 | Lauk . | |
| 5,268,475 | 12/1993 | Lauk . | |
| 5,278,291 | 1/1994 | Herd | 534/566 |
| 5,432,266 | 7/1995 | Herd et al. | 534/642 |

FOREIGN PATENT DOCUMENTS

| | | |
|---|---|---|
| 698813 | 6/1960 | Belgium . |
| 0040806 | 12/1981 | European Pat. Off. . |
| 74928 | 3/1983 | European Pat. Off. . |
| 489692 | 6/1992 | European Pat. Off. . |
| 0548795 | 12/1992 | European Pat. Off. . |
| 0548795 | 6/1993 | European Pat. Off. . |
| 965902 | 9/1957 | Germany . |
| 371090 | 9/1963 | Switzerland . |
| 633602 | 12/1949 | United Kingdom . |
| 877666 | 9/1961 | United Kingdom . |
| 893975 | 4/1962 | United Kingdom . |
| 893976 | 4/1962 | United Kingdom . |
| 903432 | 8/1962 | United Kingdom . |
| 908352 | 10/1962 | United Kingdom . |
| 914354 | 1/1963 | United Kingdom . |
| 1017271 | 1/1966 | United Kingdom . |
| 1036700 | 7/1966 | United Kingdom . |
| 1046751 | 10/1966 | United Kingdom . |
| 1091527 | 11/1967 | United Kingdom . |
| 1098916 | 1/1968 | United Kingdom . |
| 1258412 | 12/1971 | United Kingdom . |
| 1268197 | 3/1972 | United Kingdom . |
| 1270254 | 4/1972 | United Kingdom . |
| 1315939 | 5/1973 | United Kingdom . |
| 1469453 | 4/1977 | United Kingdom . |
| 1471333 | 4/1977 | United Kingdom . |
| 2015017 | 9/1979 | United Kingdom . |

OTHER PUBLICATIONS

Marechal: "Polymeric Dyes—Synthesis, Properties and Uses"; Prog. in Org. Coatings 10 (1982) pp. 251–287.

Gulbins et al; "A Novel Concept of Dye Application for Dyeing and Printing"; Novel Concept of Dye Application; JSDC, Dec. 1965; pp. 579–583.

March; "Reactions, Mechanisms, and Structure"; Advanced Organic Chemistry; pp. 742–767 (1982).

Asquith et al; "Self-coloured Polymers based on Anthraquinone Residues"; JSDC; Apr. 1977; pp. 114–125.

Stamm; "Mechanisms of Reaction of Reactive Dyes with Cellulosic and other Fibres"; JSDC; Aug. 1964; pp. 416–422.

Gangneux et al; "Synthese de substances macromoleculaires renfermant des motifs monomeres derives de colorants."; Bulletin De La Societe Chimique De France 1973 No. 4; pp. 1466–1475.

Kleb et al; "New Reactive Dyes"; Angew. Chem. Internat. Edit; vol. 3 (1964); No. 6; pp. 408–412.

Hans-Ulrich von der Eltz; "Dye Chemie der Remazol-Farbstoffe"; Melliand Textileberichte International; vol. 63 Nov. 1982; pp. 798–801.

E. Siegel; "The Chemistry of Synthetic Dyes"; vol. VI; Academic Press; 1972; pp. 58–69 and 146–155.

Venkataraman; "The Chemistry of Synthetic Dyes"; Organic and Biological Chemistry; vol. II; 1952; pp. 1138–1141.

JSDC, vol. 93, No. 4, Apr. 1977, pp. 140–141.

*Primary Examiner*—Floyd D. Higel
*Attorney, Agent, or Firm*—Cushman Darby & Cushman IP Group Pillsbury Madison & Sutro LLP

[57] ABSTRACT

A process for the coloration of a substrate, especially a textile, comprising the steps of:

(a) applying to the substrate a mixture comprising an aqueous solvent and a water-soluble dye comprising molecules which contain a nucleophilic group and an electrophilic group; and (b) heating or basifying or heating and basifying the dye thereby causing molecules of the dye to join together.

Also claimed are dyes, polymers and oligomers.

18 Claims, 2 Drawing Sheets

WATER-SOLUBLE DYES WHICH ARE POLYMERIZABLE CONTAINING MOLECULES WHICH CONTAIN A NUCLEOPHILIC GROUP AND AN ELECTROPHILIC GROUP

This is a division of application Ser. No. 08/158,220, filed Nov. 29, 1993, now U.S. Pat. No. 5,474,580, issued Dec. 12, 1995.

This invention relates to dyes, their preparation and use in the coloration of substrates.

Over the years there have been many different dyes and dyeing methods invented for textile materials. Reactive dyes, direct dyes, vat dyes and their use are well known in dyestuff art. Reactive dyes are generally water-soluble and contain a labile or reactive atom or group which may react with hydroxy groups found in cellulose to form a dye-cellulose covalent bond. Direct dyes generally have low water-solubility and contain a planar region which provide a high affinity for cotton by physical absorption. Insoluble vat dyes are applied to cellulosic fibres by reduction to their water-soluble leuco form, application to the fibre, followed by oxidation back to the original water-insoluble form. Insoluble disperse dyes are also known which require expensive grinding and dispersing agents. These dispersing agents can cause foaming during dyeing and must be carefully disposed of afterwards. Dyes containing olefinic groups which can be polymerised using a free radical initiator have also been described, but these have not been commercially successful, possibly because of poor technical performance and the inconvenient need for free radical generators.

The dyes of the present invention contain nucleophilic and electrophilic groups which enable molecules of the dye to join together when an aqueous solution of the dye is heated and/or basified. In this way the dye's molecular weight increases, its water solubility can decrease, and its affinity for any textile materials present may be increased, leading to high levels of exhaustion of the dye from the dyebath, good fixation to textiles and good wash-fastness properties for textiles dyed therewith.

According to a first aspect of the present invention there is provided a water-soluble dye comprising molecules which contain a nucleophilic group and an electrophilic group characterised in that the molecules are capable of joining together by formation of a covalent bond between the nucleophilic group of one molecule and the electrophilic group of another molecule when the dye is heated or basified.

Embodiments of the present invention and terms used are illustrated by reference to the accompanying drawings in which.

Figure 1:
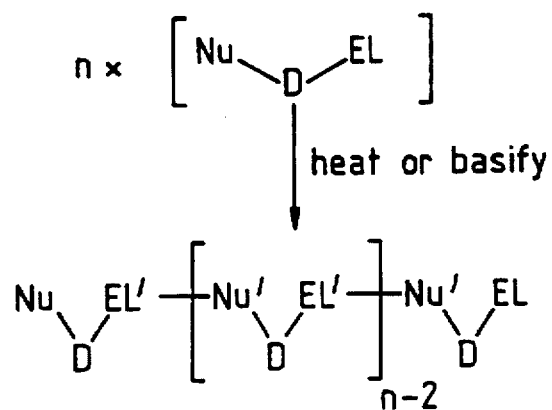
FIG. 1 is a flow chart showing schematically how dye molecules are joined together when heated or basified.

FIG. 1 illustrates the result of heating or basifying a water-soluble dye according to the invention. The dye comprises n molecules (wherein n is >1) comprising a chromophore D, a nucleophilic group Nu and electrophilic group EL and the molecules are joined together by formation of a covalent bond between the nucleophilic group of one molecule and the electrophilic group of another molecule when the dye is heated or basified. An oligomerised or polymerised dye results in which the Nu' and EL' are residues of the nucleophiles and electrophiles joined together.

Figure 2:
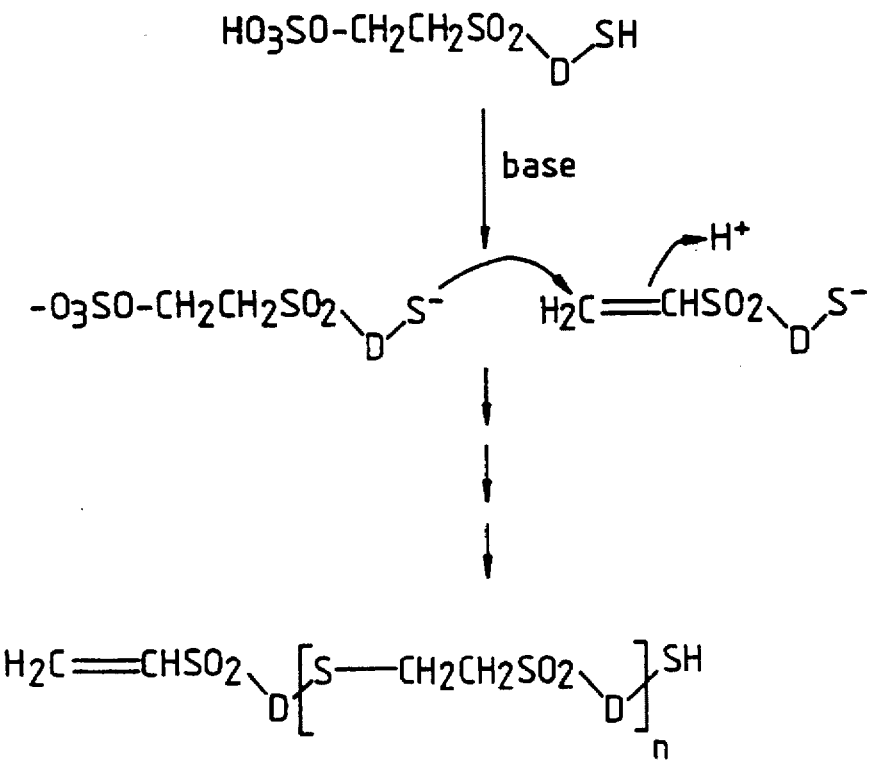
FIG. 2 is a flow chart showing how several dye molecules containing specific nucleophilic and electrophilic groups are joined together on basification through a combination of elimination and addition reactions.

FIG. 2 illustrates the result of basifying or heating a water-soluble dye according to the invention containing a nucleophilic —SH group and an electrophilic $HO_3SOCH_2CH_2O_2S$— group. Basification or heating in the presence of base causes gradual elimination of sulphato groups to give electrophilic vinylsulphonyl groups which form a covalent bond with the —S⁻ groups of other molecules of the dye to give —S—$CH_2CH_2$—$SO_2$—. Where the sulphato groups in the molecules are the only or the major water-solubilising groups, eliminination thereof causes a decrease in water-solubility and this assists the affinity and/or fixation of the dye to any substrates which are present.

Figure 3:
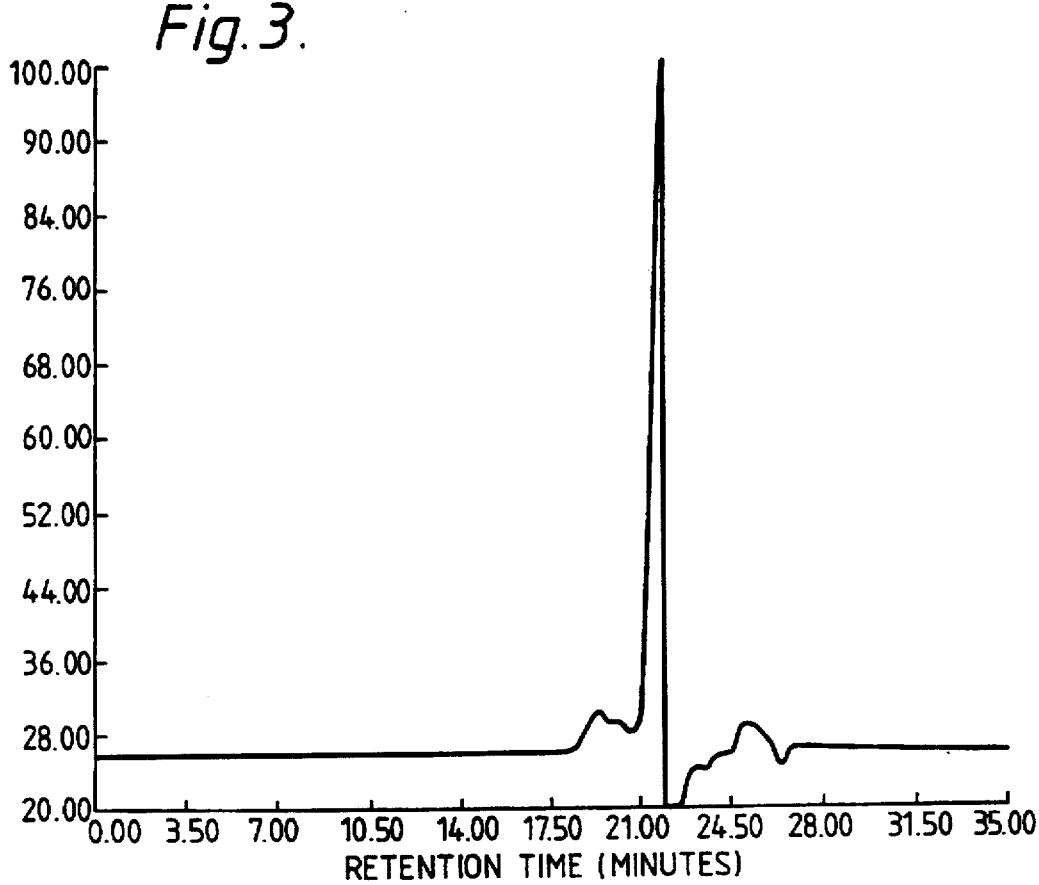
FIG. 3 is a gel permeation chromatography (GPC) trace showing the retention time of a dye according to the invention (Example 6) at pH 7, 20° C.
Figure 4:
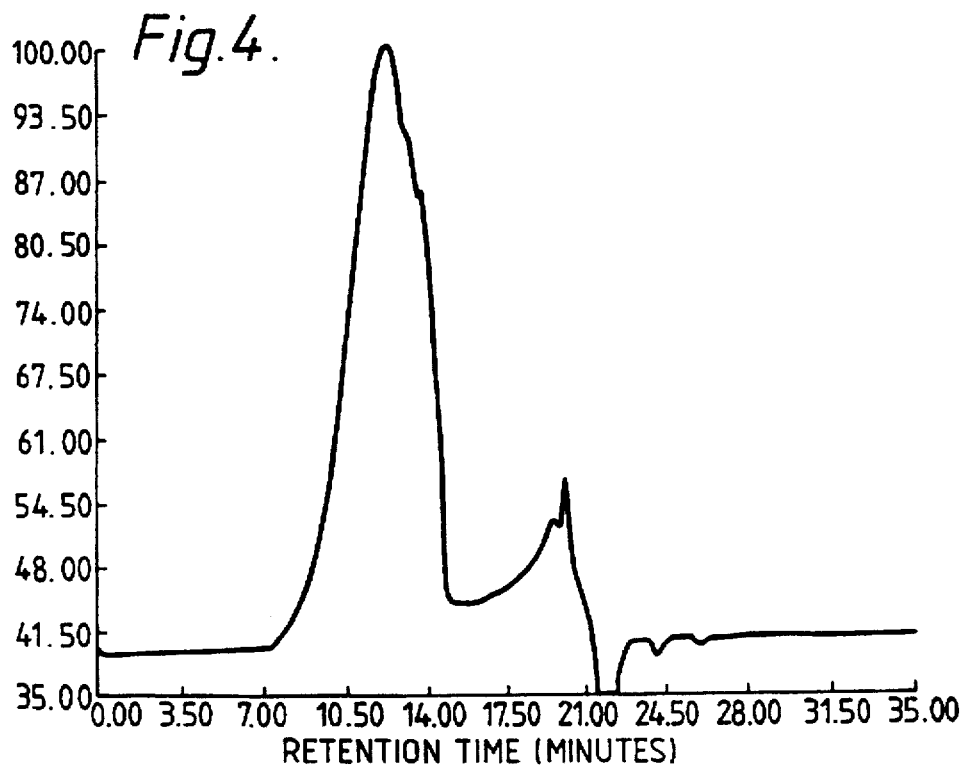
FIG. 4 is a GPC trace showing the retention time of a product obtained by basification of the dye described in Example 6 from pH 7 to pH 12.

FIGS. 3 and 4 are described in more detail in Example 6.

As will be understood from the drawings and description, the aforementioned molecules contain at least one nucleophilic group and at least one electrophilic group and they join together by formation of covalent bonds between the nucleophilic group in each molecule and the electrophilic group of another molecule to give a product of higher molecular weight.

The water-soluble dye molecules contain a chromophore which absorbs radiation at a wavelength in the region from the ultraviolet to the infra-red, preferably in the visible region of the spectrum, especially light of a wavelength from 400 to 700 nm. Preferably the chromophore has an extinction coefficient of at least 5,000, more preferably at least 10,000, especially from 10,000 to 300,000, more especially from 10,000 to 150,000. The chromophore preferably is as hereinafter described for D.

Examples of water-soluble dyes according to the invention are those which have a maximum absorbtion (i.e. λmax) in the region 400–700 nm occurring in the range 400–425 nm, 425–450 nm; 450–475 nm, 475–500 nm, 500–525 nm, 550–575 nm, 575–600 nm, 600–625 nm; 625–650 nm, 650–675 nm or 675–700 nm. The preferred extinction coefficient at the maximum absorption is as hereinbefore described.

In one embodiment the nucleophilic and electrophilic groups in the molecules of water-soluble dye are on different ends of the molecule, thereby facilitating the molecules joining together in a 'head-to-tail' manner.

The electrophilic group must be capable of forming a covalent bond with the nucleophilic group when the dye is heated or basified and this will necessarily lead to one selecting appropriate pairs of nucleophilic and electrophilic groups which satisfy this requirement. The words "are capable of joining" used when describing the present invention may therefore be replaced by "join". A skilled person may determine which pairs of nucleophilic and electrophilic groups are appropriate by heating or basifying a dye containing them and analysing the product, for example by ion spray mass spectrometry, HPLC or by gel permeation chromatography (GPC), to determine whether or not molecules of the dye have joined together to give a higher molecular weight product. Specific GPC conditions which may be used are described in Example 6.

The nucleophilic group is any group capable of forming a covalent bond with the electrophilic group of another molecule of the dye when heated or basified. Typically the nucleophilic group comprises an electron rich group, for example a group containing a negative charge or a lone pair of electrons.

Groups containing a negative charge preferably comprise a sulphur anion (i.e. —S⁻), oxygen anion (i.e. —O⁻) or a nitrogen or carbon anion (ie a nitrogen or carbon atom having a negative charge), especially —S⁻ which works particularly well, provided that the group containing a negative charge is capable of forming a covalent bond with the electrophilic group when the dye is heated or basified.

Groups containing a lone pair of electrons preferably comprise an —NH—, —NH$_2$, —N=, —S—, —SH, =S, —PR$_2$ (wherein each R independently is alkyl or alkoxy, especially —C$_{1-4}$-alkyl or —O—C$_{1-4}$-alkyl) or —OH group or a combination thereof, (for example —NHNH$_2$, —NHOH or —CO—NHOH) preferably a combination which contains at least one =S or —SH group (for example C=S, a thiourea, —CS—OH, —CO—SH, —NH—CS—NH—NH$_2$, —NH—CO—SH, —CS—NH$_2$, —NH—CS—OH, —PS(—OH)$_2$ or —O—PS(—OH)$_2$) provided that the group containing a lone pair of electrons is capable of forming a covalent bond with the electrophilic group when the dye is heated or basified.

When the group comprising a lone pair of electrons comprises an —NH$_2$ group it is preferred that the —NH$_2$ group is directly attached to an alkyl group to give an aminoalkyl group. Preferred aminoalkyl groups are or comprise a group of the formula —CH(CH$_3$)NH$_2$, —C(CH$_3$)$_2$—NH$_2$, —CH$_2$—NH$_2$ and homologues thereof.

A preferred thiourea comprises a group of the Formula —NR$^1$—CS—NR$^2$R$^3$ or —NR$^1$CS—NR$^2$—, wherein R$^1$, R$^2$ and R$^3$ are each independently selected from H and alkyl. Preferably at least one of R$^1$ and R$^2$ is H. When R$^1$, R$^2$ or R$^3$ is alkyl it is preferably C$_{1-4}$-alkyl, especially methyl.

The —SH or =S group can be attached to a heterocyclic ring, preferably 5 or 6 membered, containing 1, 2 or 3 atoms selected from nitrogen, oxygen and sulphur, hereinafter referred to as heterocyclic thiol or heterocyclic thione respectively. The preferred heterocyclic thiol or thione contains 1, 2 or more preferably 3 nitrogen atoms. As will be understood, the remaining atoms in the heterocyclic ring which make it 5 or 6 membered are carbon atoms. Preferred heterocyclic thiols or thiones carry 1 or 2 groups selected from —SH and =S. Examples of heterocyclic thiols and thiones include groups of Formula (1) and (2) and salts thereof:

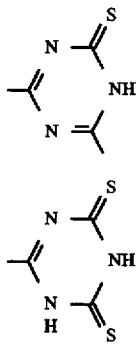

The groups of Formula (1), Formula (2) and the thioureas may exist in tautomeric forms other than those illustrated and these are included in the present invention. By way of illustration the tautomers of groups of Formula (1), include those illustrated below by Formulae (1a) and (1b) and the tautomers of groups of Formula (2) include those illustrated by (2a), (2b), (2c) and (2d) and salts thereof:

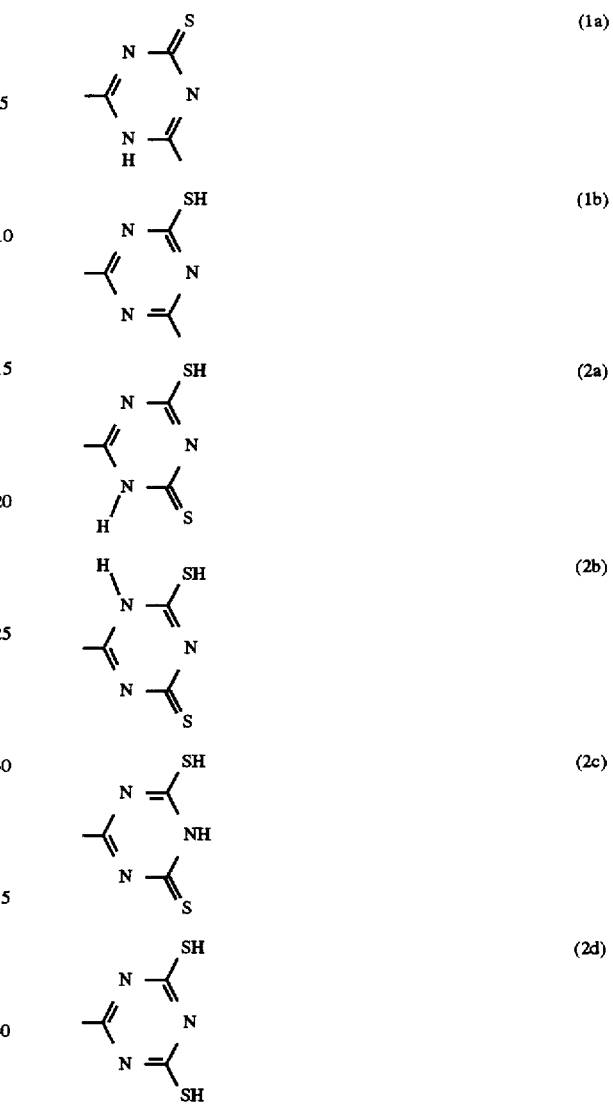

When said molecules contain a triphenodioxazine chromophore it is preferred that the nucleophilic group comprises an —SH or =S group.

The electrophilic group may be any group capable of forming a covalent bond with the nucleophilic group of another molecule of the dye when heated or basified. Preferably said electrophilic group is a group capable of undergoing 1) a substitution reaction, 2) an addition reaction or 3) an elimination and addition reaction with the aforementioned nucleophilic group.

Groups which are capable of undergoing a substitution reaction preferably comprise a carbon or sulphur atom having an electron withdrawing displaceable atom or group attached thereto, for example in the ease of carbon a halo, sulpho, quaternary ammonium or a mesylate, tosylate or acetate group and in the ease of sulphur an acyl group or —SO$_3^-$.

As examples of groups which are capable of undergoing a substitution reaction there may be mentioned halides, anhydrides of acids and heterocyclic compounds which contain at least one or preferably 2 or 3 nitrogen atoms in the heterocyclic ring and a substituent which is sufficiently labile to be removed by nucleophilic substitution by the nucleophilic group.

Preferred groups capable of undergoing a substitution reaction include groups of the formula —COCH$_2$—X$^1$, —COCHR$^4$CH$_2$—X$^1$, —COCHX$^1$CHX$^1$CO$_2$R$^5$, —COCHX$^1$CHX$^1$COR$^4$, —CH$_2$—X$^1$ and —NHCOCH$_2$—X$^1$ wherein:

X$^1$ is a labile group;

R$^4$ is H or a labile group;

R$^5$ is H or optionally substituted alkyl, aryl or heteroaryl; and

X$^1$ is preferably halo, especially chloro, bromo or iodo.

A labile group is a group displaceable by the aforementioned nucleophilic group when the dye is heated or basified.

When R$^4$ is a labile group it is preferably halo, especially chloro.

The optional substituents which may be present on R$^5$ are preferably as mentioned hereinafter for L$^2$. R$^5$ is preferably H, phenyl or C$_{1-4}$-alkyl, especially methyl or ethyl.

Groups which are capable of undergoing an addition reaction preferably comprise an epoxide group, an aziridine, aziridinium, azetidine or cyclopropane group or, more preferably, an activated alkene (e.g. alkenyl sulphone) or alkyne capable of undergoing a Michael-type addition with the aforementioned nucleophilic group.

A preferred activated alkene is or comprises a group of formula —Z$^1$—CR$^7$=CR$^8$R$^9$, —CR$^7$=CR$^9$—Z$^2$ or —CZ$^2$=CR$^7$R$^9$ wherein Z$^1$ and Z$^2$ are electron withdrawing groups and R$^7$, R$^8$ and R$^9$ are each independently H, C$_{1-4}$-alkyl or halo. Z$^1$ is preferably —SO—, —SO$_2$—, —CO—, especially —SO$_2$—, and Z$^2$ is preferably —CN, —NO$_2$, or an alkyl- or arylsulphonyl group or an acyl group. The activated alkene of formula —Z$^1$CR$^7$=CR$^8$R$^9$ may be attached to a group of formula —NR$^5$— (wherein R$^5$ is as hereinbefore defined) to give a group of formula —NR$^5$—SO—CR$^7$=CR$^8$R$^9$, —NR$^5$—SO$_2$—CR$^7$=CR$^8$R$^9$ or —NR$^5$—CO—CR$^7$=CR$^8$R$^9$. Preferred alkylsulphonyl groups are —SO$_2$—(C$_{1-4}$-alkyl) and preferred arylsulphonyl groups are phenylsulphonyl and tosyl. Preferred acyl groups are of the formula —CO—R$^5$ wherein R$^5$ is as hereinbefore defined, especially C$_{1-4}$-alkyl or phenyl. It is preferred that R$^7$ and R$^8$ are both H.

Examples of activated alkenes include the following:

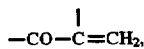

—NHCOCBr=CH$_2$, —CO—CBr=CHBr,

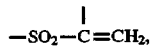

—SO$_2$—CH=CH$_2$, —SO—CH=CH$_2$, —COCCl=CCl$_2$, —SO$_2$CH=CHCl, —CH=CH—CN, —CH=CH—NO$_2$, —C(CN)=CH$_2$, —NHSO$_2$—CH=CH$_2$, —N(CH$_3$)SO$_2$CH=CH$_2$, and

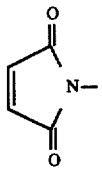

A preferred group capable of undergoing an elimination and addition reaction is or comprises a group of the formula —Z$^1$—NR$^5$—(CR$^{11}$R$^{11}$)$_m$—X$^2$ or —Z$^1$(CR$^{11}$R$^{11}$)$_m$—X$^2$, especially —Z$^1$—NH—CH$_2$—CH$_2$—X$^2$ and —Z$^1$—CH$_2$—CH$_2$—X$^2$ wherein X$^2$ is a labile group and Z$^1$ is as hereinbefore defined, especially —SO$_2$—, R$^5$ is as hereinbefore described, each R$^{11}$ independently is halo, —NH$_2$, carboxy or a group described above for R$^5$; and m is 2, 3 or 4. Preferably the labile group represented by X$^2$ is —OSO$_3$H, —SSO$_3$H, —OPO$_3$H$_2$, or a salt thereof, halo (especially chloro) or acetoxy. The groups of formula —Z$^1$(CR$^{11}$R$^{11}$)$_m$—X$^2$ may be attached to a group of formula —NR$^5$— as defined above, in which case the CR$^{11}$R$^{11}$ groups may be replaced by CHR$^{11}$ groups.

In one embodiment the aforementioned groups of formula —Z$^1$—NR$^5$—(CR$^{11}$R$^{11}$)$_m$—X$^2$, —NR$^5$—Z$^1$(CR$^{11}$R$^{11}$)$_m$—X$^2$, —Z$^1$(CHR$^{11}$)$_m$—X$^2$, —Z$^1$—CR$^7$=CR$^8$R$^9$, —CR$^7$=CR$^9$—Z$^2$ and —CZ$^2$=CR$^7$R$^9$ are attached directly to an aromatic carbon atom, for example the carbon atom of an aromatic ring such as a benzene ring, in molecules of the water-soluble dye.

Examples of groups capable of undergoing an elimination and addition reaction include the following: —SO$_2$CH$_2$CH$_2$OSO$_3$H, —SO$_2$(CH$_2$)$_3$OSO$_3$H, —SO$_2$CH$_2$CH$_2$Cl, —SO$_2$CH$_2$CH$_2$OPO$_3$H$_2$, —NHCOCH$_2$CH$_2$OSO$_3$H, —SO$_2$CH$_2$CH$_2$OCOCH$_3$, —SOCH$_2$CH$_2$OSO$_3$H, —SO$_2$CH$_2$CH$_2$SSO$_3$H, —NHSO$_2$CH$_2$CH$_2$OSO$_3$H, —NHSO$_2$(CH$_2$)$_3$SSO$_3$H, —NHSO$_2$(CH$_2$)$_4$OSO$_3$H, —N(CH$_3$)SO$_2$CH$_2$CH$_2$OSO$_3$H, —SO$_2$NH—CH(CH$_3$)CH$_2$—OSO$_3$H, —SO$_2$NH—CH(CH$_2$CH$_3$)CH$_2$—OSO$_3$H, —SO$_2$NH—C(OH)(CH$_3$)CH$_2$—OSO$_3$H, —SO$_2$NH—CH(CH$_3$)CH(Ph)—OSO$_3$H, —SO$_2$NHCH(OSO$_3$H)CH$_2$—OSO$_3$H, —SO$_2$NHCH(COOH)CH$_2$OSO$_3$H, —SO$_2$NHCH(Ph)CH$_2$OSO$_3$H, —SO$_2$NHC(CH$_3$)$_2$CH$_2$OSO$_3$H, —SO$_2$NHC(CH$_2$OSO$_3$H)$_3$, —SO$_2$NHC(CH$_3$)(OH)CH$_2$OSO$_3$H, —SO$_2$NH(CH$_2$)$_3$—OSO$_3$H and salts thereof.

The meaning of terms such as nucleophilic, electrophilic, substitution, addition, elimination and Michael-type addition are clear to organic chemists of ordinary skill and are commonly used in chemical textbooks, for example "Advanced Organic Chemistry", Fourth Edition by Jerry March, in particular pages 742 and 767 thereof.

The dye molecules according to the present invention preferably contain 1 or 2 to 6, for example 1, 2 or 3 of the nucleophilic groups and 1 or 2 to 6, for example 1, 2 or 3, of the electrophilic groups. The number of nucleophilic groups may be the same as or different from the number of electrophilic groups, for example the number of nucleophilic groups may be greater than or less than the number of electrophilic groups.

In a preferred embodiment the dye molecules of the present invention contain at least 2 of the nucleophilic groups and/or at least 2 of the electrophilic groups because this can lead to an improvement in the fixation and/or wash-fastness of the dyes to or on textile materials, possibly by providing the dye with points for crosslinking thereby enhancing immobilisation of the dye on the textile.

In one embodiment of the present invention the electrophilic group is attached to a group of Formula (1) to give a combined nucleophilic and electrophilic group, for example a group of the Formula (3) and salts thereof:

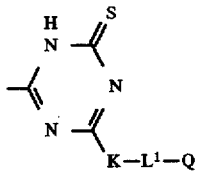

(3)

wherein:

K is —O—, —S— or —NR$^{10}$;

R$^{10}$ is H or optionally substituted alkyl;

$L^1$ is a divalent organic linker group; and

Q is a group capable of undergoing a substitution or addition reaction or elimination and addition reaction, especially —$Z^1$—$CH_2CH_2$—$X^2$ wherein $X^2$ and $Z^1$ are as hereinbefore defined.

A further example of a combined nucleophilic and electrophilic group is a group of the formula —$NR^{10}$—CS—K—$L^1$—Q wherein $R^{10}$, K, $L^1$ and Q are as hereinbefore defined.

The combined nucleophilic and electrophilic groups may exist in tautomeric forms other than those illustrated and these tautomers are included in the present invention.

When $R^{10}$ is optionally substituted alkyl it is preferably $C_{1-4}$-alkyl or $C_{1-4}$-alkyl having a substituent selected from hydroxy, halo, nitro, sulpho, carboxy, $C_{1-4}$-alkoxy, amino or cyano.

$L^1$ is preferably an alkylene, phenylene or phenalkylene linker group, especially such a group containing from 2 to 12, more especially 2 to 7 carbon atoms. When $L^1$ is an alkylene linker group it preferably comprises from 2 to 7 carbon atoms and zero, one or two atoms or groups selected from O, S, SO, $SO_2$ and NH. When $L^1$ is a phenalkylene linker group it preferably contains from 7 to 12 carbon atoms, for example —$(CH_2)_{1-6}$-phenylene-(especially benzylene) and —$(CH_2)_{1-2}$-naphthylene-. Preferably, however, $L^1$ is —$(C_{2-4}$-alkylene)-O—$(C_{2-4}$-alkylene)-, $C_{2-6}$-alkylene or phenylene, especially $C_{2-4}$-alkylene, 1,4-phenylene or 1,3-phenylene.

It is preferred that the joining together of the molecules by a covalent bond gives a product of lower water-solubility, more preferably less than 80%, especially less than 50%, more especially less than 25% and especially preferably less than 10% of the water-solubility of the original dye. In a particularly preferred embodiment joining together of two or more of the water-soluble molecules results in a product having less than 5%, more preferably less than 1%, especially negligible solubility in water (at 20° C.), wherein all percentages are by weight. The aforementioned product is oligomeric or polymeric.

The joining together of the molecules to give a product having lower solubility than the original dye may be achieved by the presence of temporary solubilising groups in the dye, that is to say groups which enhance solubility of the dye in water which are convertible by heating or basifying the dye into a group which does not enhance the solubility of the dye in water. It is preferred that at least 50%, more preferably at least 75% and especially that all solubilising groups, e.g. carboxy and/or sulpho groups, in the dye are temporary solubilising groups because the lowering of water-solubility which occurs when the temporary solubilising groups are removed can greatly enhance exhaustion of the dye from a dyebath leading to high depths of shade and high wash-fastness.

Preferred examples of such a temporary solubilising groups are β-sulphatoethylsulphonyl, β-thiosulphatoethylsulphonyl and β-phosphatoethylsulphonyl, which may also act as electrophilic groups. Basification and/or heating causes elimination of a solubilising group, for example an inorganic solubilising group such as a sulpho group (in the form of sulphate), bisulphate, thiosulphate or phosphate, to give a dye having fewer solubilising groups. In this way solubility of the dye may be reduced significantly thereby greatly enhancing the affinity and/or fixation of the dye for any substrate present.

The dyes of the present invention preferably have a water-solubility of at least 1%, more preferably at least 2%, especially at least 4%, more especially at least 8%. Preferred dyes have a water-solubility of up to 10%, more preferably up to 50%, especially up to 100%. All percentages are by weight of dye relative to weight of water (at 20° C.).

When the molecules are capable of joining together when the dye is heated it is preferred that the heating is from a first temperature to a second temperature at least 20° C. higher than the first temperature, more preferably at least 30° C. higher, especially at least 40° C. higher and optionally up to 200° C. or 300° C. higher than the first temperature. The first temperature is preferably between 0° C. and 40° C., more preferably between 5° C. and 40° C., especially between 10° C. and 30° C. The dye may be heated by any means, for example by an electrical means such as a heating mantle, infra-red, microwave or ultrasound or by using steam.

Examples of first and second temperatures as referred to above are as follows:

| First Temperature in the range | Second Temperature in the range |
| --- | --- |
| 10° C.–30° C. | 45° C.–170° C. |
| 10° C.–30° C. | 50° C.–160° C. |
| 10° C.–30° C. | 50° C.–130° C. |
| 10° C.–30° C. | 45° C.–110° C. |
| 10° C.–30° C. | 60° C.–110° C. |

When the molecules described above are capable of joining together when the dye is basified it is preferred that the basifying is from a first pH to a second pH at least 0.5 pH units higher than the first pH, more preferably at least 1 pH unit higher, especially at least 2 pH units higher, more especially at least 3 pH units higher and optionally up to 7 pH units higher than the first pH. The first pH is preferably between pH 0 and pH 8.5, more preferably between pH 2 and pH 8, especially between pH 4 and pH 8, more especially between pH 6 and pH 8 and especially preferably approximately pH 7.

Examples of tint and second pHs as referred to above are as follows:

| First pH | Second pH in the range |
| --- | --- |
| 6–8 | 8–15 |
| 6–8 | 8–13 |
| 6–8 | 8–11 |
| 7 | 8–15 |
| 7 | 8–13 |
| 7 | 8–11 |

The dye is preferably basified using an alkaline earth or alkali metal, base or salt, more preferably an alkali metal hydroxide, carbonate or bicarbonate, especially a sodium or potassium hydroxide, carbonate, bicarbonate or mixture thereof.

A preferred pair of nucleophilic and electrophilic groups capable of joining together by formation of a covalent bond therebetween when the dye is heated or basified are respectively (a) the —SH and ═S containing groups described above and salts thereof, especially the thioureas, heterocyclic thiols, thiolates and thiones; and (b) the aforementioned activated alkenes and groups capable of undergoing an elimination and addition reaction, especially groups of formula —$Zå^1$—$CR^7$═$CR^8R^9$, —$CR^7$═$CR^9$—$Z^2$, —$CZ^2$═$CR^7R^9$, —$Z^1$—$(CHR^{11})_m$—$X^2$, —$Z^1$—$NR^5$ $(CR^{11}R^{11})_m$—$X^2$ or —$NR^5$—$Z^1$—$(CR^{11}R^{11})_m$—$X^2$ as defined above, more especially —$SO_2$—CH═$CH_2$, —$SO_2CH_2CH_2OSO_3H$, —$SO_2CH_2CH_2SSO_3H$, —$SO_2NHCH_2CH_2OSO_3H$, —$SO_2NH(CH_2)_3OSO_3H$, —$NHCOCH_2CH_2OSO_3H$, —$N(CH_3)SO_2CH_2CH_2OSO_3H$, —$SO_2CH_2CH_2$—$OPO_3H_2$ and salts thereof.

According to a second aspect of the present invention there is provided a water-soluble dye comprising molecules which contain a nucleophilic group and an electrophilic group wherein:
(i) the nucleophilic group is selected from —SH and =S;
(ii) the electrophilic group is an activated alkene or a group capable of undergoing an elimination and addition reaction; and
(iii) preferably the dye has at least two of the nucleophilic and/or electrophilic groups.

In the dyes of the second aspect of the present invention the preferred —SH and =S groups are the thioureas, heterocyclic thiols and heterocyclic thiones mentioned above and the salts thereof. The preferred activated alkenes and groups capable of undergoing an elimination reaction are as mentioned above. When there are at least two nucleophilic or electrophilic groups there are preferably 2 to 6, more preferably 2 or 3 of these groups.

In dyes of the second aspect of the present invention it is preferred that the molecules are capable of joining together by formation of a covalent bond between the nucleophilic group of one molecule and the electrophilic group of another molecule when the dye is heated or basified.

In preferred dyes according to the first and second aspects of the present invention any (i.e. all) sulpho groups in the water-soluble dye are removable by heating or basifying the dye, especially by heating or basifying the dye from the first temperature or pH to the second temperature or pH as hereinbefore described. In this way removal of the sulpho groups encourages the dye to pass from the water to a substrate, for example a textile material, when an aqueous solution of the dye is heated or basified and the dyed substrate has high wet-fastness.

Preferred dyes according to the invention comprise molecules which are capable of being joined together in the absence of a free radical. The water-soluble dyes according to the invention may contain conventional diluents found in dyes, for example salts remaining from when the dye was prepared or dedusting agents, and the dye may be mixed with other dyes. The dye may also contain a colourless compound having nucleophilic and electrophilic groups as hereinbefore defined, however this is not preferred.

In the tint aspect of the present invention it is preferred that at least 10%, more preferably at least 40%, especially at least 60%, more especially at least 80% and especially preferably substantially all of the dye molecules join together by formation of a covalent bond between the nucleophilic and electrophilic groups when the dye is heated or basified.

The water-soluble dye may contain or be free from molecules of other dyes, for example dyes which have an electrophilic group but no nucleophilic group, dyes which have a nucleophilic group but no electrophilic group, and dyes which lack electrophilic and nucleophilic groups. Preferably the aforementioned other dyes, when present, constitute less than 40%, more preferably less than 20%, especially less than 10%, more especially less than 2% of the water-soluble dye (% by weight).

A preferred water-soluble dye according to the invention comprises molecules of the Formula (4):

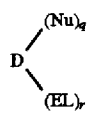

(4)

wherein:
each Nu independently is a nucleophilic group as hereinbefore described;

D comprises a chromophore;

q and r are each independently a positive integer greater than or equal to 1; and each EL independently is an electrophilic group as hereinbefore described, characterised in that the molecules of Formula (4) are capable of joining together by formation of a covalent bond between a group Nu in one molecule and a group EL of another molecule when the dye is heated or basified.

q and r are the same or different and are preferably each independently 1, 2, 3, 4 or 5, more preferably 1 or 2. Examples include dyes wherein q is 1 and r is 1; q is 1 and r is 2; q is 2 and r is 1; q is 2 and r is 2; q is 3 and r is 1; q is 3 and r is 2; q is 3 and r is 3; q is 2 and r is 3; and q is 1 and r is 3.

The nucleophilic group represented by Nu may be any of the aforementioned nucleophilic groups provided it is capable of forming a covalent bond with the electrophilic group of another molecule of the dye when it is heated or basified. Preferably each Nu independently comprises an —SH or =S group or salt thereof or a thiourea (especially when D is a triphenodioxazine chromophore) and it is particularly preferred that the —SH or =S group is attached to a heterocyclic ring to give a heterocyclic thiol or thione, especially a thiourea or group of the Formula (1) or (2) or salt thereof as described above.

The electrophilic group represented by EL may be any of the aforementioned electrophilic groups provided it is capable of forming a covalent bond with the nucleophilic group of another molecule of the dye when it is heated or basified. Preferably each EL independently is a group of formula —SO$_2$CH$_2$CH$_2$OSO$_3$H, —SO$_2$CH$_2$CH$_2$SSO$_3$H, —SO$_2$CH$_2$CH$_2$OPO$_3$H$_2$, —SO$_2$NHCH$_2$CH$_2$OSO$_3$H, —NHCOCH$_2$CH$_2$OSO$_3$H or —N(CH$_3$)SO$_2$CH$_2$CH$_2$OSO$_3$H or a salt thereof.

A group EL and a group Nu may be present in a combined nucleophilic and electrophilic group, for example a group of Formula (3) as shown above or a group of formula —NR$^{10}$—CS—K—L$^1$—Q as defined above.

The chromophore represented by D is preferably of the azo, anthraquinone, phthalocyanine, triphenodioxazine, triphenylmethane, formazan, xanthene or benzodifuranone (BDF) series or a combination thereof, especially a chromophore of the azo series. In one embodiment D is free from sulpho groups.

Preferred chromophores of the azo series are monoazo and disazo chromophores. Preferred monoazo chromophores are of the formula —L$^2$—N=N—L$^2$— wherein each L$^2$ independently is an optionally substituted arylene or heteroarylene radical.

It is preferred that each arylene radical independently is mono- or di-cyclic. Preferred arylene radicals are optionally substituted phenylene and naphthylene. Preferred heteroarylene radicals are optionally substituted pyridonylene, pyrazolonylene, benzthiazolene, isothiazolene, thiazolene and thiophene. The optional substituents which may be present on L$^2$ are preferably selected from C$_{1-4}$-alkyl, especially methyl; cyano; C$_{1-4}$-alkoxy, especially methoxy; hydroxy; thio; thione; amino; halo, especially chloro; and amido, especially acetamido, benzamido or sulphonamido; ureido; halomethyl; carboxy; carboxymethyl; cyclohexyl; phenyl; and mono- and dialkylamino.

A preferred monoazo compound according to the invention is of the Formula (5) or a tautomer or salt thereof:

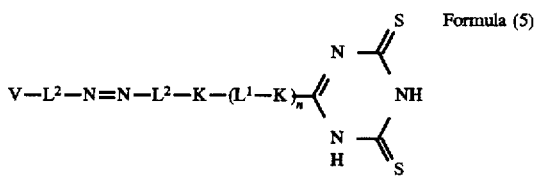

wherein:

V is or comprises a group capable of undergoing an addition reaction or an elimination and addition reaction;

n has a value of 0 or 1; and each $L^1$, $L^2$ and K independently is as hereinbefore defined.

Preferably each V independently is or comprises a group of the formula $-Z^1-CR^7=CR^8R^9$, $-CR^7=CR^9-Z^2$, $-CZ^2=CR^7R^9$, $-Z^1-NR^5-(CR^{11}R^{11})_m-X^2$; $-NR^5-Z^1-(CR^{11}R^{11})_m-X^2$ or $-Z^1(CHR^{11})_m-X^2$ as hereinbefore defined, especially a group of formula Z—$CH_2CH_2$—$O_2S$— wherein Z is $HO_3SO$—, $HO_3SS$— or $H_2O_3PO$—.

A preferred disazo compound according to the invention is of Formula (6) or a tautomer or salt thereof:

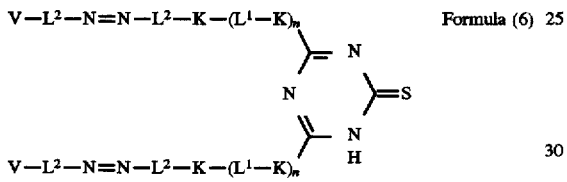

wherein each

V, $L^1$, $L^2$, K and n independently is as hereinbefore defined.

A preferred disazo chromophore is of Formula (7) or salt thereof:

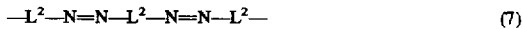

wherein:

each $L^2$ independently is as hereinbefore defined.

A preferred water-soluble dye of Formula (4) wherein D is an anthraquinone chromophore is of the Formula (8):

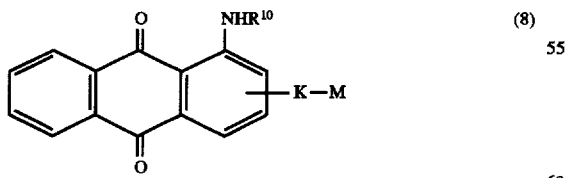

wherein:

K and each $R^{10}$ is as hereinbefore defined;

M is a group of formula —$(L^1)_n$—$NR^{10}$—CS—K—L—Q (wherein each $L^1$, $R^{10}$, n, K and Q are as hereinbefore defined) or of Formula (3) as hereinbefore defined; and the anthraquinone nucleus is optionally substituted by one, two or three groups selected from sulpho, hydroxy, alkoxy, aryloxy and amino.

A preferred water-soluble dye of Formula (4) wherein D is a phthalocyanine chromophore is of the Formula (9) or a salt thereof:

wherein Pc is a phthalocyanine nucleus, preferably a copper, nickel or metal-free phthalocyanine; each W independently is a substituted or unsubstituted amino group; a and b each independently have a value from 0 to 3 and c has a value from 1 to 3 provided that a+b+c is not greater than 4; K, $L^1$ and $R^{10}$ are as hereinbefore defined; and M is a group of Formula (3) as hereinbefore defined.

A preferred water-soluble dye of Formula (4) wherein D is a triphenodioxazine chromophore is of the Formula (10):

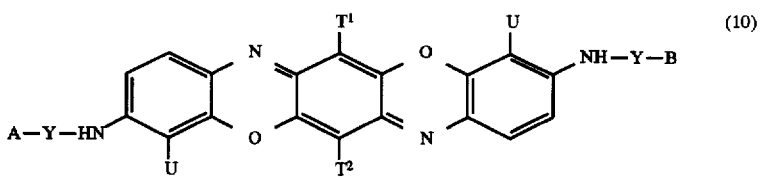

wherein:

each Y independently is a covalent bond, $C_{2-4}$-alkylene, —C(=O)—($C_{1-4}$-alkylene)-, phenylene-C(=O)-phenylene- or sulphophenylene;

each U is H, $SO_2NR^5R^5$, $SO_3R^5$, —$SO_2NHCH_2CH_2OSO_3H$ or —$SO_2$—$CH_2$—$CH_2$—$X^2$;

$T^1$ and $T^2$ are H, halo, $C_{1-4}$-alkyl, or $C_{1-4}$-alkoxy;

$X^2$ and each $R^5$ independently is as hereinbefore defined;

A is or comprises a nucleophilic group as hereinbefore defined; and

B is H or is or comprises an electrophilic group; provided that (i) when B is H one or both of the groups represented by U is —$SO_2$—$CH_2$—$CH_2$—$X^2$ or —$SO_2NHCH_2CH_2$—$X^2$; and (ii) two or more of the molecules of Formula (10) are capable of joining together by formation of a covalent bond between the nucleophilic group of one molecule and the electrophilic group of another molecule when the dye is heated or basified.

Each Y is preferably —$C_2H_4$— or —$C_3H_6$—.

$T^1$ and $T^2$ are preferably Cl or methyl.

A is preferably a —SH or =S containing group, more preferably a group of formula —$NR^1$—CS—$NR^2R^3$ or a heterocyclic thiol or thione group as defined above.

B is preferably H or —$SO_2$—$CH_2CH_2$—$X^2$ wherein $X^2$ is as hereinbefore defined.

A second preferred water-soluble dye of Formula (4) wherein D is a triphenodioxazine chromophore is of the Formula (11):

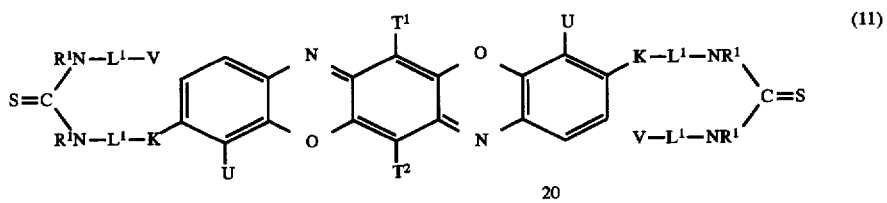

wherein:

each U, $T^1$, $T^2$, $L^1$, $R^1$, V and K independently is as hereinbefore defined.

A third preferred water-soluble dye of Formula (4) wherein D is a triphenodioxazine chromophore is of the Formula (12):

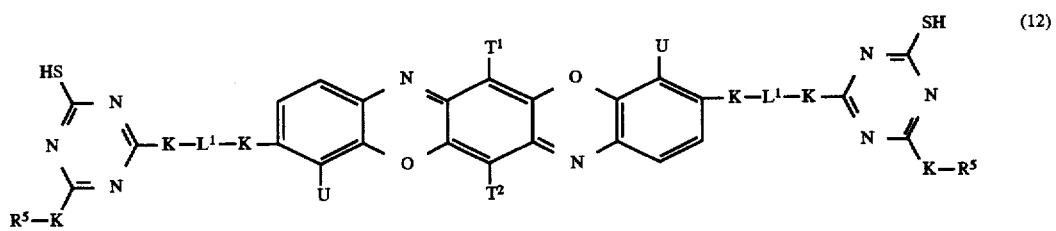

each K, $L^1$, U, $T^1$ and $T^2$ independently is as hereinbefore defined, provided that the dye of Formula (12) contains at least one group capable of undergoing an addition reaction or an elimination and addition reaction, especially a group defined above by V. In a preferred embodiment $R^5$ is phenyl or naphthyl substituted by V, as defined above.

A preferred water-soluble dye of Formula (4) wherein D is a formazan chromophore is of the Formula (13):

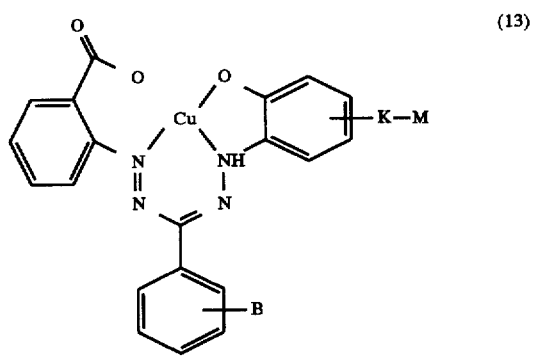

wherein B, K and M are as hereinbefore defined. The benzene rings shown in Formula (13) optionally are substituted by a sulpho group.

A preferred water-soluble dye of Formula (4) wherein D is a BDF chromophore is of the Formula (14):

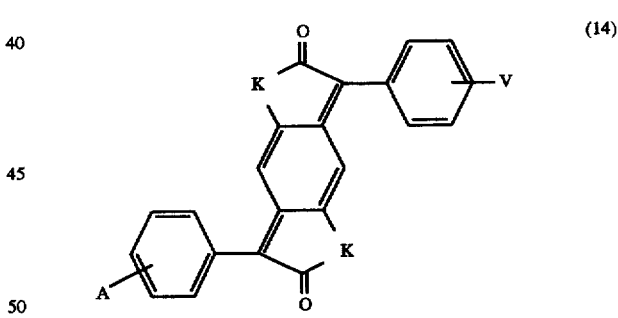

wherein:

each K, A and V independently is as hereinbefore defined; provided that two or more molecules of Formula (14) are capable of joining together by formation of a covalent bond between the nucleophilic group of one molecule and the electrophilic group of another molecule when the dye is heated or basified.

Dyes according to the invention may be prepared by analogous methods to those described in the dyestuff art except that intermediates are selected which will result in the dye having the aforementioned nucleophilic and electrophilic groups, for example condensation of a compound having a nucleophilic group with a compound having an electrophilic group, wherein one or both of the compounds contains a chromophore. It is preferred that the condensation is performed at 10°–90° C. especially 20°–90° C., more especially 40°–90° C. Preferably the condensation is performed in a liquid medium, more preferably an aqueous medium or dimethylsulphoxide. Precise conditions used will depend upon the nucleophilic and electrophilic group and will be selected so as to prevent premature polymerisation of the desired dye.

The condensation is preferably performed in the presence of an acid-binding agent. The function of the acid-binding agent is to neutralise any acid formed during the condensation. Accordingly any acid-binding agent may be used provided that it is not present in such a concentration that it causes hydrolysis of the reactants or causes some other side-reaction. It is preferred to use an alkali metal hydroxide, carbonate or bicarbonate, added at such a rate that the pH of the mixture stays within the range of 5.0 to 6.0.

Alternatively dyes according to the invention containing an azo chromophore may be prepared by coupling two suitable precursors, for example coupling an azo component and a coupling component, one having a nucleophilic group and the other having an electrophilic group. Such a coupling will normally be performed at below 5° C., in water using $NaNO_2$ and mineral acid to form the azo component from an amine.

Dyes according to the invention which contain a thiol or thione heterocycle, for example of Formula (1) or (2), are preferably prepared by heating the corresponding dye or a precursor thereof containing a heterocyclic group having a labile halo (e.g. chlorine) substituent (for example a compound containing a group of Formula (1) or (2) where in place of —SH or =S there is a chloro atom) with sodium hydrosulphide or thiophosphate in aqueous medium at 0°–30° C. or preferably with sodium thiosulphate at 0°–100° C., especially 25°–60° C. The aqueous medium may contain a water miscible organic solvent, for example an alcohol or ketone.

A particularly convenient method for preparing dyes according to the invention is by reacting a dye of formula D—$NH_2$ with an isothiocyanate of formula EL—$L^1$—N=C=S, wherein D, EL and $L^1$ are as hereinbefore defined. This method allows a dye of Formula D—NHCSNH—$L^1$—EL to be prepared in a single step. This method is preferably performed in aqueous solvent, especially water, preferably at pH 4 to 7, more preferably 6 to 7. A temperature of 10° C. to 50° C. is preferred, especially 10° C. to 30° C. After performing the process the dye may be isolated, for example by conventional means such as spray drying.

Although formulae have generally been shown in their unionised or free acid form in this specification, the invention also relates to the dyes in the salt form, particularly their $NH_4^+$ salts and their salts with alkali metals such as the sodium, potassium, lithium or mixed sodium/lithium salt. Thus groups shown as —SH include —$S^-$.

A further feature of the present invention provides a composition comprising an inert carrier and a water-soluble dye according to the invention, preferably in a weight ratio of 99:1 to 1:99, more preferably 10:1 to 1:50, especially 5:1 to 1:10. The inert carrier preferably comprises inorganic salts and optionally a de-dusting agent. Examples of inorganic salts include alkali and alkali earth metal halides, carbonates, bicarbonates, nitrates and mixtures thereof. Dodecylbenzene may be used as a de-dusting agent.

According to a further aspect of the present invention there is provided a process for the coloration of a substrate comprising the steps of:

(a) applying to the substrate a mixture comprising an aqueous solvent and a water-soluble dye comprising molecules which contain a nucleophilic group and an electrophilic group; and (b) heating or basifing or heating and basifying the dye thereby causing molecules of the dye to join together.

As there is no need for a flee-radical initiator in this process it is preferred that no such initiator is added to the mixture and the mixture is free from or substantially free from organic free radicals or such an initiator. Similarly, there is no need to add $Na_2S$ to the mixture and it is preferred that the mixture is free from or substantially free from $Na_2S$, particularly since this compound can lead to unpleasant odours. In this way the process advantageously does not smell of $H_2S$.

Preferably the water-soluble dye is completely dissolved in the aqueous solvent. The nucleophilic group, electrophilic group and water-soluble dye are preferably as described in the first aspect of the present invention. It is preferred that heating and/or basifying the dye causes molecules of the dye to join together by formation of a covalent bond between the nucleophilic group of one molecule and the electrophilic group of another molecule of the dye. Preferably heating and/or basifying the dye forms a dye of lower water-solubility and higher affinity for the substrate.

The mixture used in Step (a) preferably comprises 0.01 to 20 parts of dye per 100 parts of water, more preferably 0.1 to 10 parts of dye per 100 parts of water. The water-solubility of the dye used in step (a) and the percentage of dye molecules which join together in step (b) are preferably as hereinbefore described in relation to dyes of the invention. The mixture may also contain NaCl, for example 0 to 20 parts, more preferably 4 to 16 parts of NaCl per 100 parts of water. All parts are by weight.

Preferably the water-soluble dye used in step (a) is as described in the first or second aspect of the present invention.

The preferred substrate is a metal or plastic, more preferably a porous material, and especially good results are found for leather, paper and textile materials. Porous materials are preferred because the dye may permeate therein before being heated and/or basified to fix the dye. The textile material is preferably a natural, semi-synthetic or synthetic material.

The water-soluble dyes of the invention may be in solid or liquid form. The solid form is, advantageously, more storage stable because there is less opportunity for the nucleophilic and electrophilic groups to react with one another during storage. The solid form is also cheaper to transport because it weighs less than a water-containing liquid form.

Examples of natural textile materials include wool, silk, hair and cellulosic materials, particularly cotton, jute, hemp, flax and linen.

Examples of semi-synthetic textiles include nitrocellulose, viscose rayon including TENCELR available from Courtaulds, England, cuprammonium rayon and cellulose acetates.

Examples of synthetic fibres include polyamides, polyesters, polyacrylonitriles and polyurethanes.

The preferred coloration process according to the invention is a pad-batch, continuous, semi-continuous, or exhaust dyeing process or a printing process. During exhaust dyeing the dyes can demonstrate particularly efficient exhaustion from the dyebath. Suitable printing methods include applying the dye to a substrate which has, where necessary, been pretreated, for example using an alkali. Alternatively the dye may be printed to the fibre and fixed by heating. Ink jet printing is one method of printing and this is of particular value where the substrate is a paper or cotton.

In a preferred pad batch dyeing process the mixture comprising an aqueous solution of the dye according to the invention is padded on a substrate at a temperature in the range 5° C. to 40° C. and the dye is heated to a second temperature 10° C. to 75° C. higher, preferably 20° C. to 30° C. higher than the first temperature, preferably for a period of at least 2 hours, e.g. 2 to 48 hours.

In a second coloration process the mixture described in Step (a) is alkaline and the mixture is padded onto the substrate and remains in contact therewith for at least 1 hour, e.g. 2 to 48 hours.

Dyes of the invention may be used to prepare inks used in ink jet printing. Preferred inks comprise a dye according to the invention and a liquid medium, for example an aqueous medium.

The ink preferably contains from 0.5% to 20%, more preferably 0.75% to 15%, especially from 1% to 5% by weight of the dye, based on the total weight of ink.

The liquid medium and aqueous solvent are preferably water or a mixture comprising water and a water-soluble organic solvent, preferably in the range 99:1 to 1:99, more preferably 95:1 to 50:50, especially 90:10 to 60:40.

The water-soluble organic solvent preferably comprises a $C_{1-4}$-alkanol, especially methanol or ethanol; a ketone, especially acetone or methylisobutylketone; a glycol, especially diethylene glycol; 2-pyrrolidone; N-methylpyrrolidone; or a mixture thereof.

In a third variation of the coloration process the mixture in step (a) comprises a solution of the dye in water and the mixture is applied to the substrate by immersing the substrate in a vessel containing said mixture. Heating, basifying or heating and basifying the solution in Step (b), preferably forms a dye of lower water-solubility and higher affinity for the substrate.

In this third variation a substrate may be dyed with a mixture comprising water and a dye according to the invention at a substantially constant temperature, for example at a temperature in the range 15° to 140° C., and the pH raised from a first to second pH as described above, preferably from a first pH in the range 4 to 8, more preferably 6 to 8, to a second pH 0.5 to 7 pH units higher, more preferably from 2 to 5 pH units higher than the first pH.

If desired in this third variation one may dye at substantially constant pH, for example at a pH in the range 8 to 11, the temperature may be raised from a first temperature in the range 10° to 50° C., preferably 15° to 30° C., to a second temperature 15° to 130° C. higher, preferably 20° to 50° C. higher than the first temperature.

Alternatively both the pH and temperature may be raised during the third coloration process, preferably from the first to second temperatures and from the first to second pHs described in the preceding two paragraphs. Conventional dye bath additives may be added to assist coloration of the substrate, for example salt or dyeing auxiliaries.

In a fourth variation of the coloration process the mixture in Step (a) preferably contains a humectant and in Step (b) the dye is heated to a temperature in the range 90° C. to 230° C., preferably 95° C. to 220° C., preferably for a period of 0.25 minutes to 45 minutes, more preferably 0.5 minutes to 30 minutes. Preferably the humectant is present in an amount of 0 to 25 parts, more preferably 1 to 21 parts per 100 parts of water, wherein all parts are by weight.

In one aspect of the fourth variation the mixture has pH of 8.5 to 14, more preferably pH 9 to 11. Another aspect of the fourth variation contains the extra step of drying the product of Step (a) before performing Step (b).

As humectant there may be used polypropyleneglycol, dicyandiamide or preferably urea.

In the fourth variation we have found that dyes wherein the nucleophilic group comprises an —SH or =S group (especially the thioureas and heterocyclic thiols and thiones described above) and the electrophilic group is or comprises a group of formula —$Z^1$—$CR^7$=$CR^8R^9$, —$CR^7$=$CR^9$—Z, —$Z^1$—$NR^5(CR^{11}R^{11})_m$—$X^2$ or —$NR^5$—$Z^1$—$(CR^{11}R^{11})_m$—$X^2$ (as defined above) work particularly well giving strong dyeings with good wet and rub-fastness.

When the nucleophilic group present in the water-soluble dye used in the coloration process comprises an —$NH_2$ group directly attached to an alkyl group it is preferred that the mixture contains pH buffer. The function of the pH buffer is to maintain the —$NH_2$ group in unprotonated form during the process. Any suitable buffer which achieves this function may be used and the precise choice will depend upon the $pK_b$ of the —$NH_2$ group.

It is preferred that the water-solubility of the molecules joined together by Step (b) is less than 10%, more preferably less than 5%, especially less than 1%, of the water-solubility of the original dye (at 20° C., all percentages by weight relative to water) because this leads to improved wash-fastness for the dyed substrate. This can be achieved by using dyes wherein any sulpho groups present in the molecules are removed by Step (b), e.g. all the sulpho groups are temporary solubilising groups. Preferably the molecules joined together by Step (b) are free from sulpho groups. One may assess the solubility of the molecules when joined together simply by performing the above process in the absence of a substrate, isolating the product and measuring its solubility in the normal manner. Alternatively the process may be performed in the presence of a cellulosic substrate and, after dyeing, the cellulosic matter is digested by a cellulase enzyme to free the polymerised dye whose solubility may be measured in the normal manner. The extent to which dye molecules join together may be measured by HPLC or GPC.

A further feature of this invention comprises a polymer or oligomer (and a process for their preparation) obtained or obtainable by heating or basifying or heating and basifying a water-soluble dye according to the first or second aspect of the present invention. The aforementioned oligomer and polymer preferably are free from sulpho groups, preferably have negligible solubility in water at 20° C., and preferably have a molecular weight of 2 to 1000 times, more preferably 5 to 100 times the molecular weight of the original dye molecules before heating or basification. Preferably the heating and/or basifying is from first to second temperatures and pHs as described hereabove.

Use of a dye according to the present invention to form an oligomerised or polymerised compound (i.e. an oligomer or polymer) forms a further feature of the invention.

A still further feature of the invention is a substrate, especially a textile material, coloured using a water-soluble dye or by a coloration process according to the invention.

The invention is further illustrated by the following examples in which all parts and percentages are by weight unless otherwise stated. Compounds described in comparative examples are not to be interpreted as known.

EXAMPLE 1

Preparation of

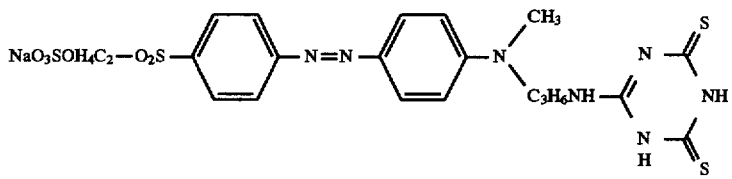

Stage a

A solution of 2-(3-N-methylanilino)-propylamino-4,6-dichloro-s-triazine (6.8 g) in acetone (200 ml) was added dropwise to a mixture prepared by adding hydrochloric acid (2N, 53 ml) to a solution of sodium sulphide (24 g) in water (200 ml) at 10° C. The resultant mixture was stirred overnight at about 20° C., filtered and the filtrate acidified to precipitate 2-(3-N-methylanilino)-propylamino-4,6-dithione.

Stage b

To p-aminophenylsulphatoethylsulphone (1.74 g) in water (150 ml) at 0°–5° C. was added 2N sodium nitrite (3.1 ml) and concentrated hydrochloric acid (5 ml) and the mixture stirred for 20 minutes. This solution was added dropwise to a solution of 2-(3-N-methylanilino)-propylamino-s-triazin-4,6-dithione (3.1 g) dissolved in water (50 ml) at pH 5.5 and 0°–5° C. After stirring for 2 hours salt (30 g) was added and the resultant orange solid filtered off, washed with brine and dried to give the title product (3.7 g) having one temporary solubilising group. λmax 480.4 nm (H$_2$O). An infra red absorption spectrum (KBr disk) showed peaks at 3452, 3097, 1621, 1601, 1524, 1449 and 886 cm$^-$.

Exhaust Dyeing

The title dye (0.2 parts) was dissolved in water (50 parts) at 25° C. and pH 9 and cotton (5 parts) and salt (2.5 parts) were added. The dye was fixed to the cotton by raising the temperature to 80° C. and maintaining this for 1 hour. The cotton was removed and washed in soapy water to give bright orange cotton having high wet fastness.

Pad Dyeing

The title dye (0.03 parts) was dissolved in water (14 parts) and 2N sodium carbonate (2 mls) added. Cotton (2 parts) was padded with the dye solution and then stored at room temperature for 24 hours. Washing-off gave bright orange cotton with a high depth of shade and wet fastness.

Wool Dyeing

The title dye (0.1 part) was dissolved in water (50 parts) at 25° C. at pH 6.3, and untreated wool (5 parts) added. The temperature was raised to 100° C. at a rate of 1.5° C./minute and the dyeing continued for 2 hours to give 99.5% exhaustion. The wool was cooled, rinsed at 60° C. for 20 minutes then dried to give a bright orange dyeing with very high fixation at good all round wet fastness.

Dyeing on wet full chrome leather

A dyebath drum may be prepared containing water at 60° C.±5° C. (80 to 200 ml per piece of leather) and 1.5% of title Dye on weight of wet full chrome leather (wet blue sheepskin). After 35 minutes emulsified anionic fat liquor (i.e. a water-oil emulsion, 1.5%) is added, followed 15 minutes later by formic acid (equivalent to half the weight of dye used). After a further 15 minutes the dyed leather pieces are removed from the dyebath, rinsed for 5 minutes with cold, soft running water, samreed (squeezed to remove water), dried at 55° C.±5° C. and staked (staked means that the leather is softened by working it over a blunt blade). The leather is dyed an attractive orange shade with good fastness properties.

Dyeing of retanned side leather

Dyeing may be carried out by running pieces of chrome retanned side leather in a drum containing 1.5% of the title dye in water, at 60° C. over 30 minutes, followed by addition of fat liquor and 30 minutes later by 0.75% of formic acid. After 30 minutes running the pieces are rinsed, drained for 24 hours, sammed, dried, sawdusted, staked and suspended by a clamp in a dryer. The dye penetrates the leather pieces well and gives strong orange shades with good light fastness properties.

Dyeing Of Nylon

The title dye (0.2 parts) was dissolved ha water (50 pars) at 30° C. and pH 7.0, and nylon 66 cloth (5 parts) was added. Ammonium acetate (1 part) was added and the temperature raised to 95° C. over ½ hr. After a further 1 hour, the cloth was removed and rinsed in water to give a bright orange dyeing with high exhaustion and good all round wet fastness.

Dyeing of Polyester

The title dye (0.1 part) was dissolved in water (50 parts) at 25° C. and pH 6.5, and polyester cloth (5 parts) was added. The dyeing was performed at 130° C., under pressure, to given an orange cloth having good wet-fastness.

Dyeing of Polyester-Cotton Blends

The title dye (0.1 part) was dissolved in water (50 parts) at 28° C. and pH 7.5 and polyester-cotton (40–60) added. The dyeing was performed at 130° C., under pressure, to give an orange cloth with high fixation and good wet-fastness.

EXAMPLE 2

Preparation of

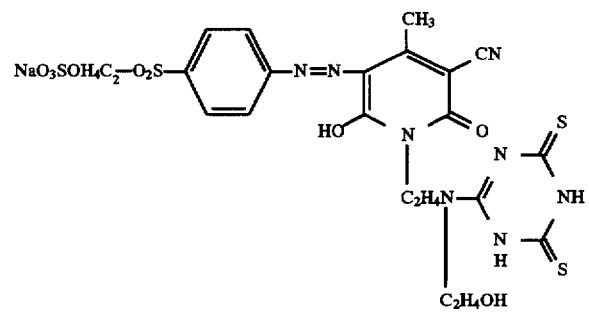

Stage a

Cyanuric chloride (2 g) was added to a solution of N-β-hydroxyethylaminoethyl-3-cyano-6-hydroxy-4-methylpyrid-2-one (2.63 g) in water (150 ml) at 0°–5° C., pH 7, and the mixture stirred for 2 hours. Sodium sulphide (9.6 g) was added along with sufficient 2N HCl to adjust the pH to 8 and the mixture stirred at 20° C. overnight. The mixture was acidified to pH 2 to give 2-N -β-hydroxyethyl-N'-(3-cyano-6-hydroxy-4-methylpyridonyl)-ethylamino-s-triazin-4,6-dithione (4.1 g).

Stage b

To p-aminophenylsulphatoethylsulphone (2.81 g) in water (150 ml) at 0°–5° C. was added 2N sodium nitrite (5 ml) and concentrated hydrochloric acid (5 ml) and the mixture stirred for 20 minutes. This solution was added dropwise to a solution of 2-N-β-hydroxyethyl-N'-(3-cyano-6-hydroxy-4-methylpyridonyl)ethylamino-s-triazin-4,6-dithione (4 g) in water (100 ml) at pH 5.5 and 0°–5° C. After stirring for 2 hours salt (40 g) was added, the resultant yellow solid isolated by filtration and washed with brine to give the title product (6.2 g). λmax 427.6 nm (H$_2$O). An infra red absorption spectrum (KBr disc) showed peaks at 3400, 2228, 1742, 1685, 1641, 1595, 1512, 843, 794 and 711 cm$^{-1}$.

The title dye (0.2 parts) was dissolved in water (50 parts) at 25° C. and pH 7 and cotton (5 parts) and salt (2.5 parts) were added. The dye was fixed to the cotton by raising the temperature to 50° C. and basifying to pH 11.0 and maintaining this for 1 hour. The cotton was removed, and washed in soapy water to give bright yellow cotton having high wet fastness.

EXAMPLE 3

Preparation of dropwise to a mixture prepared by adding hydrochloric acid (2N, 55 ml) to a solution of sodium sulphide (25 g) in water (200 ml) at 10° C. The resultant mixture was stirred at 0° C. for 3 hours. The resultant suspension was filtered, the filtrate acidified to precipitate 2-(5-hydroxy-7-sulpho-2-naphthylamino)-s-triazine-4,6-dithione which was filtered off (6.5 g).

Stage c

To p-aminophenylsulphatoethylsulphone (4.2 g) in water (100 ml) at 0°–5° C. was added 2N sodium nitrite (73 ml) and concentrated hydrochloric acid (5 ml) and the mixture stirred for 20 minutes. This solution was added dropwise to a solution of 2-(1-hydroxy-3-sulpho-6-naphthylamino)-s-triazin-4,6-dithione (6.5 g) in water (100 ml), at 0°–5° C. and pH 5.5. The reaction mixture was stirred for 3 hours, filtered, the filtrate salted to 15% with sodium chloride and the solid so formed collected by filtration to give the product (10.1 g). λmax 479 nm (H$_2$O). An infra red absorption spectrum (KBr disc) showed peaks at 3400, 1616, 1593, 1499, 1486, 1213, 1129, 1048, 991 and 732 cm$^{-1}$.

The title dye (0.1 parts) was dissolved in water (30 parts) at 25° C. and pH 7 and cotton (5 parts) and salt (1.5 parts) were added. The dye was fixed to the cotton in good yield and a high level of exhaustion observed when the temperature was raised to 90° C. and maintained there for 1 hour. The cotton was removed and washed in soapy water to give bright orange cotton.

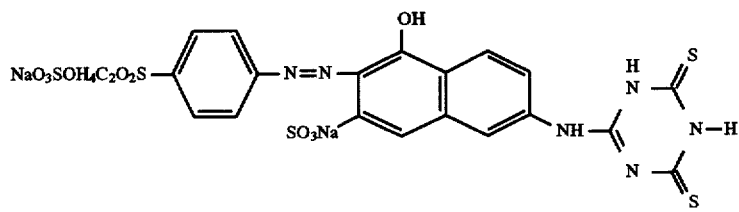

Stage a

Cyanuric chloride (4 g) was added to a solution of 6-amino-3-sulphonaphthalene (6.8 g, 72% strength) in water (150 ml) at 0°–5° C., pH 6.5 and the mixture stirred for 2 hours. The temperature was raised to 25° C. and the mixture was stirred for a further 48 hours. Salt (20 g) was added to precipitate 11.2 g of 2-(5-hydroxy-7-sulpho-2-naphthylamino)-4,6-dichloro-s-triazine.

Stage b

A solution of 2-(5-hydroxy-7-sulpho-2-naphthylamino)-4,6-dichloro-s-triazine (7.74 g) in water (100 ml) was added

EXAMPLE 4

Preparation of

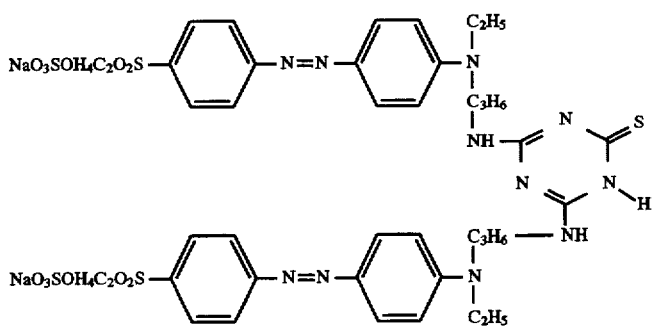

To p-aminophenylsulphatoethylsulphone (1.8 g) in water (80 ml), at 0°–5° C., was added 2N sodium nitrite (3.2 ml) and concentrated hydrochloric acid (5 ml) and the mixture stirred for 20 minutes. This solution was added dropwise to a solution of 2,4-bis-(3-N-ethylanilino)-propylamino-s-triazin-6-thione (1.5 g) (prepared by treatment of 2,4-bis-(3-N-ethylanilino)-propylamino-6-chloro-s-triazine with sodium sulphide and HCl analogous to Example 1) in water (100 ml), at 0°–5° C. and pH 6.0. The reaction mixture was stirred for 2 hours, filtered, and the filtrate salted to 20% with sodium chloride. The orange solid so formed was collected by filtration, washed with brine and dried to give the title compound (2.4 g) having two temporary solubilising groups. λmax 471.2 nm (H$_2$O) and infra-red absorption spectrum (KBr disc) showed peaks at 3458, 2931, 1602, 1510, 1418, 1372, 1299, 1246, 1127, 1048 and 997 cm$^{-1}$.

The compound dyed cotton, in orange shades, by exhaustion and padding methods to give high fixation and high wet fastness.

The title dye (0.2 parts) was dissolved in water (50 parts) at 25° C. and pH 7 and cotton (5 parts) and salt (2.5 parts) were added. The dye was fixed to the cotton by basifying to pH 11 and maintaining this for 4 hours. The cotton was removed and washed in soapy water to give bright orange cotton having high wet fastness.

EXAMPLE 5

Preparation of

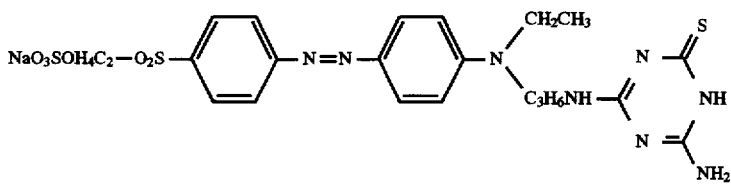

Stage a
To a solution of N-ethyl-gamma-aminopropylaniline (10.7 g) in acetone (250 ml) was added CaCl$_2$ (10 g) and the suspension cooled to 0° C. A solution of cyanuric chloride (9.7 g) in acetone (100 ml) was added slowly keeping the temperature below 5° C. After 1 hour water (25 ml) was added and the reaction mixture heated under reflux for 24 hour. The insoluble matter was filtered off, concentrated ammonium hydroxide was added (150 ml) and the mixture stirred for 24 hours. The resultant precipitate was filtered off and the chlorine group in the triazine was replaced by a thio group using sodium sulphide in an analogous manner to Stage a of Example 1 to give 2-(3-N-ethylanilino)propylamino-4-amine-s-triazine-6-thione.
Stage b
The method of Example 1, Stage b was followed except that in place of 2-(3-N-methylanilino)propylamino-s-triazine-4,6-dithione there was used 2-(3-N-ethylanilino)propylamino-4-amino-s-triazine-6-thione to give the title product as an orange solid having a λmax at 486 nm (H$_2$O) and a mass spectrum showing an isotopic cluster at m/z 595 consistent with the title compound.
Dyeing
The title dye (5 parts) was dissolved in water (78 parts) at 29° C. and pH 7.5, sodium carbonate (2 parts), sodium alanate (Manutex F700, 5 parts) and urea (10 parts) were added to give a print paste. The print paste was applied to cotton, dried and fixed by heating at 105° C. for 10 minutes to give a bright orange cloth with high fixation and good wet-fastness.

EXAMPLE 6

Preparation of

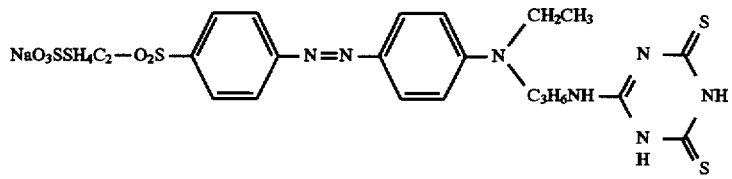

The general method of Example 1 was followed except that in place of p-aminophenylsulphatoethylsulphone there was used p-amino phenylthiosulphatoethylsulphone and in place of 2-(3-N-methylanilino)propylamino-4,6-dichloro-s-triazine there was used 2-(3-N-ethylanilino)propylamino-4,6-dichloro-s-triazine.

The title product (having one temporary solubilising group) was obtained as an orange solid having a λmax at 486 nm (H$_2$O). An infra red absorption spectrum (KBr disc) showed peaks at 3413, 3199, 3092, 1602, 1586, 1517, 1216, 1142, 1025, 876, 764 and 631 cm$^{-1}$.
Gel Permeation Chromatography Analysis
a)—the Column A 60 cm$^3$ mixed gel (M3/5) Column packed with styrene/divinyl copolymer gel having a particle size of 10 μm and molecular weight from 2×10$^2$ to 2×10$^6$ (relative to polystyrene standards), was obtained from Polymer Laboratories. This column operates by size exclusion such that the packing material has a higher affinity for low molecular weight (MWT) compounds than high MWT compounds causing the retention time for low MWT compounds to be greater than for high MWT compounds.
b)—title Product 50 μl of a solution prepared by dissolving the title Product (0.02 g) in dimethylformamide ("DMF", 10 ml) was loaded onto the Column and eluted with DMF at a rate of 1 cm$^3$/minute. The optical density of liquid eluted from the Column was measured using an ERMA ERC-710 detector and plotted on a graph. A large peak was observed on the graph 21 minutes after elution started, showing the title product was leaving the Column. This graph is shown in FIG. 3.

c)—title product after basification

A solution of the title product at pH 8.5, 20° C., was basified to pH 11 using Na₂CO₃ to give an orange precipitate. The precipitate (0.02 g) was dissolved in DMF (10 ml) loaded onto the Column and eluted exactly as described in b) above. The appearance of a peak on the graph at significantly less than 21 minutes after elution started (12 minutes in the present GPC system), showed that the molecules of the title product had joined together to give a higher MWT product by formation of a covalent bond between the nucleophilic group of one molecule and the electrophilic group of another molecule. This graph is shown in FIG. 4 and can be compared with FIG. 3.

EXAMPLE 7

Preparation of

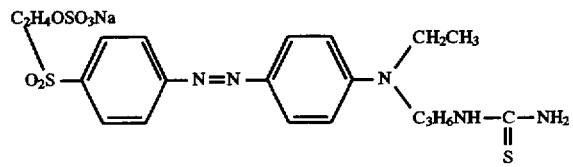

Stage a

A solution of thiophosgene (7.43 ml) in CH₂Cl₂ (300 ml) was added dropwise over 1½ hours at 20° C. under a nitrogen atmosphere to a stirred solution of N-ethyl-N-(3-aminopropyl)aniline (17.8 g) and triethylamine (27.8 ml) in CH₂Cl₂ (500 ml). The mixture was stirred at 20° C. for a further 1½ hours then heated under reflux for 1½ hours. The mixture was allowed m cool washed with water, dried over MgSO₄, filtered and solvent removed from the filtrate in vacuo. The product was purified by chromatography on silica gel eluting with CH₂Cl₂ to give N-ethyl-N-(3-isothiocyanatopropyl)aniline (72 g) as a red oil.

Stage b

A solution containing the product from Step a (2.20 g), ammonia solution (0.97 ml, d=0.880), tetrahydrofuran (10 ml) and water (5 ml) was heated under reflux for 3 hours, cooled to 20° C., then stirred at 20° C. for 12 hours. The mixture was poured into water, extracted using CH₂Cl₂ and the combined extracts washed, dried and solvent removed to give N-ethyl-N-phenyl-3-aminopropylthiourea (2.51 g) as an oil.

Stage c

The general method of Example 1, Stage b, was followed except that in place of 2-(3-N-methylanilino)-propylamino-s-triazine4,6-dithione there was used N-ethyl-N-phenyl-3-aminopropylthiourea to give the title product having a λmax at 482 nm (H₂O). An infra red absorption spectrum (KBr disc) showed peaks at 3910, 2928, 1602, 1514, 1371, 1247, 1127, 1050, 994, 820 and 747 cm⁻¹.

EXAMPLE 8

Preparation of

Stage a

Bis-carbonamidoethylaniline (19 g), borane/tetrahydrofuran complex (1N, 480 ml) and tetrahydrofuran (480 ml) were heated under reflux under an atmosphere of nitrogen for 16 hours. The mixture was cooled, methanol (250 ml) added and the solvent distilled off to give an oil. The oil was redissolved in methanol (200 ml) and concentrated hydrochloric acid (50 ml) added to give N,N-bis(3-aminopropyl)aniline hydrochloride.

Stage b

The product from Stage a was converted to N,N-bis(3-thioureidopropyl)aniline using a method analogous to that described in Example 7, Stages a and b except that in place of N-ethyl-N-(3-aminopropyl)aniline there was used the product of Example 8, Stage a.

Stage c

The general method of Example 1, Stage b was followed except that in place of 2-(3-N-methylanilino)-propylamino-s-triazine-4,6-dithione there was used N,N-bis(3-thioureidopropyl)aniline to give the title product having a λmax at 473 nm (H₂O) and an infra red absorption spectra (nujol mull) showing peaks at 3311, 1599, 1515, 1365, 1250, 1268, 1047, 996, 883, 825, 741 and 572 cm⁻¹.

The title dye (0.1 part) was dissolved in water (50 parts) at 30° C. and pH 8.5 and cotton (5 parts) added. The temperature was raised to 90° C. over 1 hour and then maintained for a further ½ hour. The cotton was removed, rinsed in cold water to give a bright orange dyeing with very high exhaustion and high fixation.

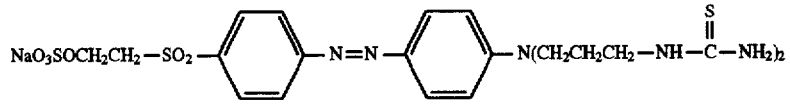

EXAMPLE 9

Preparation of

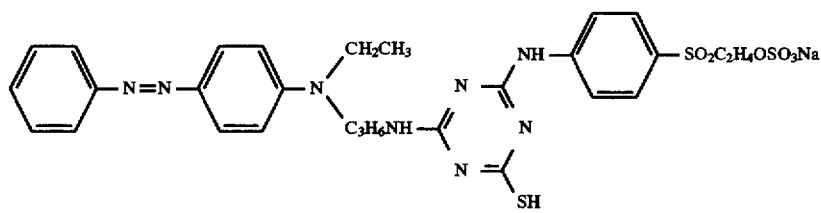

Stage a

Cyanuric chloride (3.93 g) was dissolved in acetone (50 ml) and added to ice/water (100 g). p-Aminophenylsulphatoethylsulphone (5.62 g) was stirred in water (150 ml) and the pH adjusted to 4.5 with sodium acetate. This solution was added to the cyanuric chloride suspension over ½ hour then stirred for a further 2 hours maintaining pH 4–4.5 with 2N sodium carbonate to give a dichlorotriazine suspension. N-Ethyl-N-phenyl-3-aminopropylamine (4.0 g) was stirred in water (100 ml) and the pH adjusted to 5.5 using acetic acid. This solution was added to the dichlorotriazine suspension over ¼ hour then the temperature was raised to 40° C. and the reaction stirred overnight at 4° C. maintaining pH 5–5.5.

The acetone was distilled off at 60° C. and a solution of sodium thiosulphate (7.5 g) in water (100 ml) added followed by glacial acetic acid (50 ml). The reaction was heated to reflux and stirred for 8 hours then allowed to cool overnight with stirring.

The reaction was diluted with water to 1000 ml and the pH adjusted to 5 using sodium acetate to give a solid precipitate. The supernatant liquor was decanted off and the solid stirred in acetone (100 ml) for 1 hour. The solid was filtered off, washed with acetone and dried to give 3.2 g of a solid.

Stage b

Aniline (0.5 g) was dissolved in a mixture of water (50 ml) and concentrated hydrochloric acid (3 ml), cooled to 0° C. and diazotised using 2N sodium nitrite solution (2.6 ml). The diazo solution was added to a suspension of the solid from Stage a (2.85 g) in water (100 ml) at 0° C. and stirred for 3 hours maintaining pH 5.5–6 then allowed to reach room temperature overnight. Salt (13 g) was added to improve the physical form, the solid was filtered off, washed with 5% brine and dried to yield the title product (3.6 g) as a yellow dye. The infra-red absorption spectrum (KBr-disc) showed peaks at 3384, 2966, 1597, 1494, 1401, 1241, 1139, 996, 826, 738 at 534 $cm^{-1}$.

The title compound dyed cotton yellow shades by exhaust dyeing to give high exhaustion.

The title dye (0.05 parts) was dissolved in water (50 parts) at 20° C., pH 6.5, and cotton (5 parts) and salt (1 part) were added. Sodium bicarbonate (1 part) was added, the temperature was raised to 80° C. and the solution left standing for 1 hour. The cotton was removed and washed in soapy water to give bright yellow dyeing. The dye was notable for the very high exhaustion.

EXAMPLE 10

Preparation of

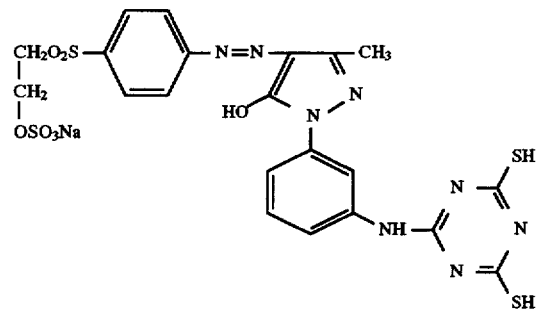

Stage a

To 1-(3-aminophenyl)-3-methylpyrazolone (8.5 g) in water (150 mls) at 0° C. was added cyanuric chloride (11 g) in acetone (50 mls) and the pH adjusted to 5 using sodium hydroxide solution. After 2 hours the solid so formed was filtered off and washed with water. The resultant damp paste was suspended in water (100 ml), sodium hydrosulphide (11.1 g) was added and the reaction stirred for 16 hours at room temperature. Acidification with hydrochloric acid gave the desired dithiol (13 g).

Stage b p-Aminophenylsulphatoethylsulphone (2.5 g) was diazotised using the method described in Example 1 Stage b, and added to the product of Stage a above (3 g), at pH 6–7, 0°–5° C. The title product was precipitated by addition of KCl as a mustard coloured solid (7.5 g); λmax 394 nm ($H_2O$).

EXAMPLE 11

Preparation of

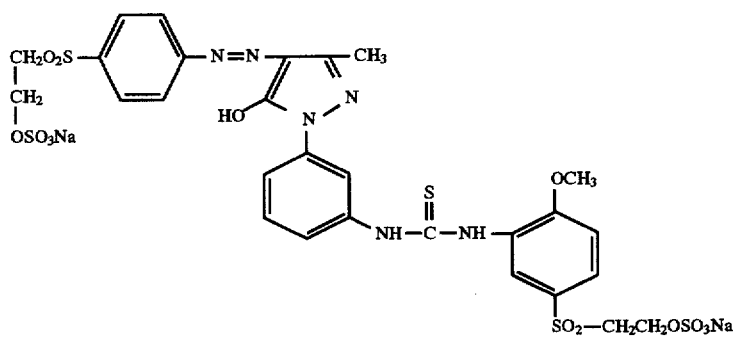

Stage a

To 1-(3-aminophenyl)-3-methylpyrazolone (1.7 g) in water (10 ml), pH 6–7, was added 1-isothiocyano-2-methoxyphenyl-5-sulphatoethyl sulphone (3.5 g) and acetonitrile (25 ml) and the reaction mixture stirred overnight. The solid which formed was filtered off to give a thioureidopyrazolone (2.2 g).

Stage b p-Aminophenylsulphatoethylsulphone (1 g) was diazotised using the method described in Example 1, Stage b, and added to a solution of the thioureidopyrazolone (2 g) from Stage a above to give the title product (1 g); $^1$H-nmr ($d_6$-DMSO) 2.4(3H,D,$CH_3$), 3.4–4.1 (11H,m,$OCH_3$+4× $CH_2$), 7.2–8.5 (11H,m,ArH), 9.6 (1H,D,NH) and 10.6 (1H, D,NH).

The title dye (0.2 parts) was dissolved in water (50 parts) at 20° C., pH 7.0, and cotton (5 parts) and salt (2 parts) were added. The pH was raised to 11 and the solution left standing for 1 hour. The cotton was removed and washed in soapy water to give a bright yellow shade. The dye was notable for the very high fixation and good wet fastness.

EXAMPLE 12

Preparation of

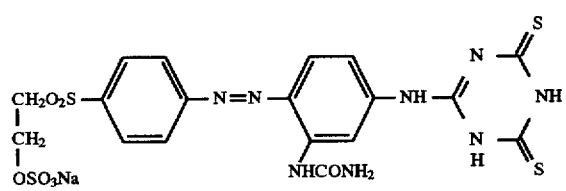

Stage a

1-Aminophenylsulphatoethylsulphone (11.2 g) was diazotised as described in Example 1 and added to a solution of m-ureidoaniline (11.2 g) in water (400 mls) at pH 6–6.5 and 0°–5° C. The yellow solid so formed was collected by filtration, washed with brine, and used in Stage b.

Stage b

The yellow solid from Stage a (12.5 g) was suspended in a mixture of water (200 ml) and acetonitrile (200 ml) and cyanuric chloride (4 g) added at 5° C. The pH was kept at 5.5–6.5 and stirring continued for 3 hours. When HPLC indicated the reaction was complete sodium thiosulphate (4 g) was added and the mixture stirred at 50° C., pH 7–7.5, for 20 hours. After cooling, salt (20 g) was added and the yellow title product filtered off (9 g). The infra-red absorption spectrum (KBr disc) showed peaks at 3356, 1578, 1464, 1220, 1135, 995, 881 and 741 cm$^{-1}$.

The title dye (0.1 part) was dissolved in water (50 parts) at 2° C., pH 9 and cotton (5 parts) and salt (2 parts) were added. The temperature was raised to 80° C. and the solution left standing for 1 hour. The cotton was removed and washed in soapy water to give a bright golden yellow shade. The dye was notable for the very high exhaustion, very high fixation and excellent wet fastness.

EXAMPLE 13

Preparation of

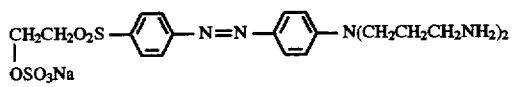

Stage a

N,N-(Biscarboxamidoethyl)aniline (19 g), borane tetrahydrofuran complex (480 ml) and tetrahydrofuran (100 ml) were stirred and heated under reflux and a nitrogen atmosphere for 16 hours. Methanol (250 ml) was added, the solvent distilled off, then methanol (200 ml) and concentrated hydrochloric acid (50 ml) added and the mixture heated under reflux for 1 hour. Evaporation and recrystallisation from isopropanol gave a solid product (23 g).

Stage b p-Aminophenylsulphatoethylsulphone (2.8 g) was diazotised as in Example 1 and added to the solid from Stage a (2.7 g) in water (25 ml) and the pH maintained at about 4 using sodium acetate. The title product was precipitated by adding acetone and collected as an orange solid (9.6 g). The structure was confirmed by FAB mass spectrometry m/z 498 (M–H$^-$).

Dyeing

The title dye (2 parts) was dissolved in water (100 parts) at 20° C., and NaCl (5 parts) and cotton (5 parts) were added. The mixture was heated at 50° C. for 30 minutes, $Na_2CO_3$ (2 parts) was added and heating continued for 1 hour. The cotton was removed, washed with water at 90° C. and dried. High exhaustion and wash-fastness were observed.

Comparative Example A

The method of Example 13 was repeated except that in place of N,N-(biscarboxamidoethyl)aniline there was used N,N-bis(β-hydroxyethyl)aniline to give a product of the formula shown in Example 3 wherein instead of the two —$CH_2CH_2CH_2NH_2$ groups there is found —$CH_2CH_2OH$ groups, hereinafter referred to as the "hydroxy compound".

Examination of the hydroxy compound by GPC indicated that the molecules were not capable of joining together when heated or basified, even when a solution thereof at pH 11.5 was heated at 130° C. for 1 hour.

EXAMPLE 14

Preparation of

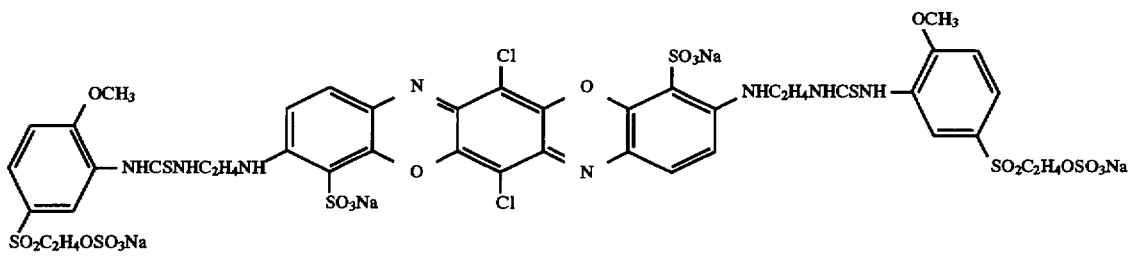

Stage a

To 3-amino-4-methoxyphenylsulphatoethylsulphone (16.7 g) in water (200 ml) at pH 6.4 was added thiophosgene (63 g). The reaction mixture was stirred at pH 6.4 for 20 minutes, salt added to 10% (w/v) and the solid so formed collected by filtration, washed with 10% brine and with isopropanol to give an isothiocyanate (11.2 g).

Stage b

To 3,10-diamino-6,13-dichloro-4,11-disulphotripheno dioxazine (2.7 g), tetrahydrofuran (50 ml), acetonitrile (50 ml) and water (50 ml) was added the isothiocynnate from Stage a (4.2 g). The reaction mixture was stirred under reflux for 2 days, the solvent then distilled off, isopropanol (200 ml) added and the solid so formed isolated by filtration to give the title product (1.7 g) having two temporary and two permanent solubilising groups. The mass spectrum showed an isotopic cluster at m/z 1379 corresponding to (M+2Na–H)⁻ consistent with the above structure.

The title dye (2 parts) was dissolved in water (500 parts) at 55° C., pH 7, and cotton (50 parts) and salt (25 parts) were added. The pH was raised to 11 and the solution left standing for 1 hour. The cloth was removed and washed in soapy water to give a bright bright reddish blue dyeing. The dye was notable for the very high exhaustion and fixation.

The title product was analysed by Gel Permeation Chromatography exactly as described in Example 6. The title product at pH 7, 20° C., was found to have a retention time of 21½ minutes before basification, and a retention time of 13 minutes after basification to pH 12.

Comparative Example B

A compound was prepared having an identical structure to that shown in Example 14 except that the two nucleophilic "NHCSNH" groups were replaced by "NHCONH" groups, hereinafter referred to as the "TPD ureido dye".

Examination of the TPD ureido dye by GPC indicated that the molecules were not capable of joining together when heated or basified, even when a solution thereof at pH 11.5 was heated at 130° C. for 1 hour.

EXAMPLE 15

Preparation of

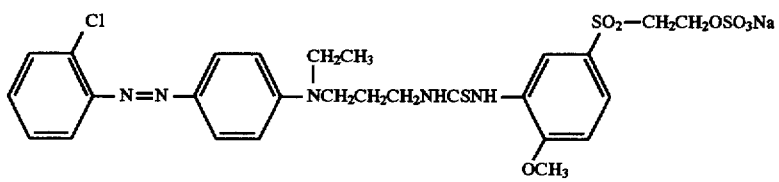

Stage a

To N-ethyl-N-β-isothiocyanatopropylaniline (2.7 g), tetrahydrofuran (50 ml) and acetonitrile (50 ml) was added 3-amino-4-methoxyphenylsulphatoethyl sulphone (3.8 g) and the reaction mixture heated under reflux for 2 days. The solvent was distilled off, the residue slurried in isopropanol (100 ml) and the solid so formed collected by filtration (1.7 g).

Stage b

An aqueous solution of orthochloroaniline (0.2 g) was diazotised and added to the product from Stage a (0.7 g) in water (20 ml) at pH 4. Isopropanol (200 ml) was added, and the resultant solid filtered off to give the title product (0.6 g). The FAB mass spectrum gave an m/z at 668 corresponding to (M–H)⁻, consistent with the title dye.

The title dye (2 parts) was dissolved in water (500 parts) at 50° C., pH 7, and cotton (50 parts) and salt (25 parts) were added. The pH was raised to 11 and the solution left standing for 0.5 hours. The cloth was removed and washed in soapy water to give a bright orange dyeing. The dye was notable for the very high exhaustion and fixation.

EXAMPLE 16

Preparation

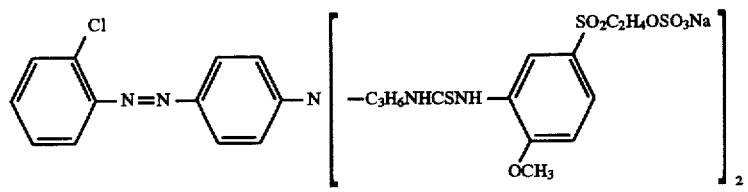

Stage a

To N,N-(bis-β-isothiocyano)ethylaniline (3.5 g), tetrahydrofuran (50 ml) and acetonitrile (50 ml) was added 3-amino-4-methoxyphenylsulphatoethyl sulphone (7.7 g) and the mixture heated under reflux for 2 days. The product was isolated as in Example 15, Stage c, to give a solid (2.9 g).

Stage b

An aqueous solution of orthochloroaniline (0.2 g) was diazotised and added to the product from Stage a (1.4 g), in water (20 ml) at pH 4. The title product was isolated as in Example 15, Stage b, to give an orange solid (0.73 g). The FAB mass spectrum showed an isotopic duster at m/z 1072 corresponding to (M+Na–H)⁻ consistent with the above structure.

The title dye (1 part) was dissolved in water (250 parts) at 60° C., pH 7, and cotton (25 parts) and salt (12.5 parts) were added. The pH was raised to 11 and the solution left standing for 1 hour. The cloth was removed and washed in soapy water to give a bright orange dyeing. The dye was notable for the very high exhaustion and fixation.

The title product was analysed by Gel Permeation Chromatography exactly as described in Example 6. The title product at pH 7, 20° C., was found to have a retention time of 21½ minutes before basification, and a retention time of 12 minutes after basification to pH 11.

EXAMPLE 17

Preparation of

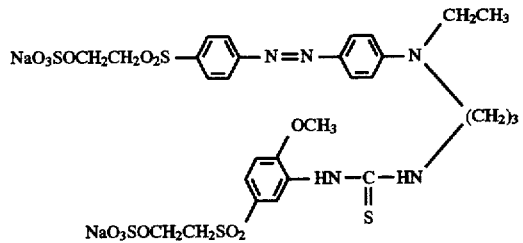

Stage a

The method of Example 15, Stage a, was followed.

Stage b

To p-aminophenylsulphatoethylsulphone (0.4 g) in water (20 ml), at 0°–5° C., was added concentrated hydrochloric acid (0.7 ml) followed by 2N sodium nitrite (0.7 ml) and the mixture stirred for 1 hour. A solution of the product from Stage a (0.7 g) in water (20 ml) was added and the mixture stirred at 0°–5° C. and pH 4 for 2 hours. Isopropanol (200 ml) was added, and the resultant solid filtered off to give the title product (0.8 g) (λmax: 485 nm). The FAB mass spectrum gave an m/z of 822 corresponding to (M–H), consistent with the title dye.

The title dye was applied to cotton using the method described in Example 15.

EXAMPLE 18

Preparation of

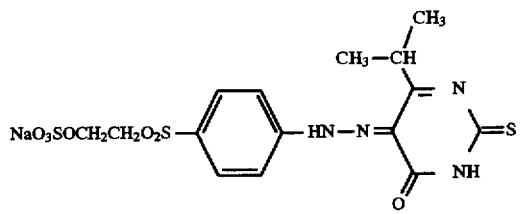

p-Aminophenylsulphatoethylsulphone (11 g) was diazotised as described in Example 1 and added to 4-hydroxy-2-mercapt-6-propylpyrimidine (6.7 g) in water (50 ml), the pH adjusted to 6.5 and the reaction mixture stirred for hours. Sodium chloride (20 g) was added and the precipitate isolated by filtration to give the title product (8.2 g). The infra-red spectrum (KBr disc) showed peaks at 3418, 3232, 2933, 1655, 1520, 1445, 1398, 1251, 1139, 1055, 1001, 891, 835 and 740 cm⁻¹.

The title dye (0.1 part) was dissolved in water (50 parts) at 20° C., pH 9, and cotton (5 parts) and salt (2 parts) were added. The temperature was raised to 90° C. and the solution left standing for 1 hour. The cotton was removed and washed in soapy water to give a bright yellow dyeing. The dye was notable for its very high exhaustion.

EXAMPLE 19

Preparation of

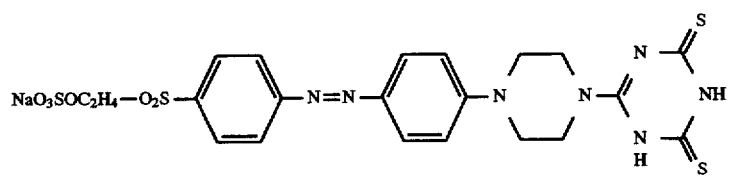

The method of Example 1 was repeated except that 2-(N-phenylpiperazinyl)-4,6-dichlorotriazine was used in place of 2-(3-N-methylanilino)propylamino-4,6-dichloro-s-triazine. The title product was obtained as an orange solid and showed infra-red absorption peaks (KBr) at 3405, 3094, 2920, 1602, 1499, 1439, 1368, 1214, 1137, 996, 959, 864, 759 and 687 cm$^{-1}$.

The title dye (0.2 parts) was dissolved in water (50 parts) at 25° C., pH 7.5, and cotton (5 parts) and salt (2 parts) were added. The pH was raised to 11 and the solution left standing for 2 hours. The cotton was removed and washed in soapy water to give bright orange cotton. The dye was notable for the very high exhaustion and fixation and excellent wet fastness.

EXAMPLE 20

A composition may be prepared by mixing the dye of Example 11 (5 parts) and the dye of Example 14 (95 parts) to give a green dye which may be applied to cotton by the method described in Example 14.

EXAMPLE 21

The method of Example 9 was repeated except that in Stage b, in place of aniline there was used an equivalent amount of p-aminophenylsulphatoethylsulphone. The resultant product was applied to cotton in a similar manner to that described in Example 9 and was found to have very good exhaustion.

EXAMPLE 22

The method of Example 1 was repeated except that in Stage b, in place of p-aminophenylsulphatoethylsulphone there was used an equivalent amount of 3-amino-4-chloro-N-(β-sulphatoethyl)-benzenesulphonamide. Analysis by mass spectrum showed a molecular ion at 662 as expected.

EXAMPLE 23

Preparation of

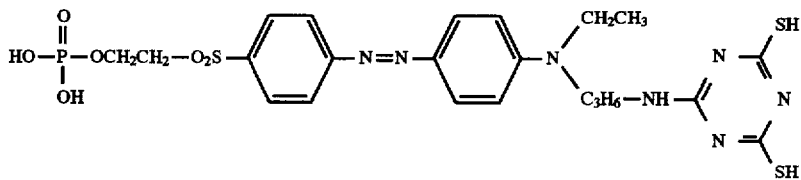

The method of Example 1 was repeated except that in Stage a, 2-(3-N-ethylanilino)-propylamino-4,6-dichloro-s-triazine was used in place of 2-(3-N-methylaniline)-propylamino-4,6-dichloro-s-triazine and in Stage b p-aminophenyl phosphatoethylsulphone was used in place of p-aminophenylsulphatoethylsulphone. The title product was obtained as an orange solid.

The title product (0.4 parts) was dissolved in water (20 parts) at 22° C., pH 11.0 and the solution applied to cellulose. The cloth was dried, then heated to 165° C. for 1 minute. The cloth was rinsed in cold water to give a bright orange dyeing with good fixation and good wet-fastness.

EXAMPLE 24

Preparation of

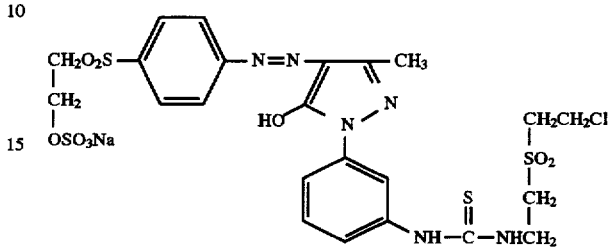

Stage a

Thiophosgene (2.1 g) in $CH_2Cl_2$ (34 ml) was added to a solution of $Cl-CH_2CH_2SO_2CH_2NH_2 \cdot HCl$ (3.4 g) in water (45 ml), followed by addition of $NaHCO_3$ (4.1 g). The mixture was stirred for 1 hour at below pH 7. Extraction with $CH_2Cl_2$, drying and trituration with hexane gave an off-white solid (2.6 g) showing peaks at 2210 and 2141 cm$^{-1}$ (KBr disc).

Stage b

The product from Stage a (2.1 g) was added to a solution of 1-(3-aminophenyl)-3-methylpyrazolone (1.7 g) in water (10 ml) and acetonitrile (15 ml) at pH 6–7. The mixture was stirred overnight at 20° C. to give a solid precipitate. The solid was filtered-off, washed and dried to give 1.5 g solid.

Stage c p-Aminophenylsulphatoethylsulphone was diazotised as described in Example 1, Stage b, and coupled onto the product from Stage b above. The title product resulted and mass spectrum confirmed an m/z at 693 corresponding to $(M-H)^-$.

The title product (0.1 parts) was dissolved in water (50 parts) at 20° C., pH 6.8 and cotton was added. $Na_2CO_3$ (1 part) and salt (0.5 parts) were then added. The temperature was raised to 85° C. over 0.5 hour and maintained for 0.5 hour. The cotton was removed, rinsed in cold water to give a bright yellow dyeing with very good wet-fastness.

EXAMPLE 25

Preparation of

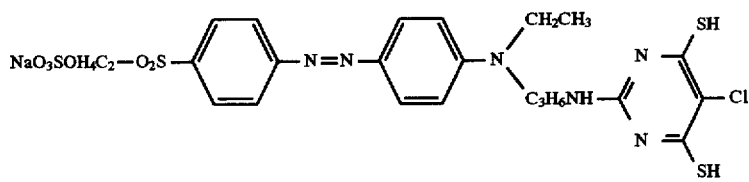

Stage a

N-ethyl-N-(3-aminopropyl)aniline (1.78 g), tetrachloropyrimidine (2.18 g), CaCO$_3$ (2.5 g) and acetone (100 ml) were stirred together for 48 hours to give a suspension. The unwanted solid was removed by filtration.

Stage b 2N HCl (40 ml) was added to a mixture of Na$_2$S (19.2 g) and water (150 ml) at 10° C. The filtered acetone solution from Stage a was added dropwise, with stirring, and stirring was continued for 1 day at 20° C. Acidification to pH 3.5 gave a yellow precipitate (0.8 g) which showed an isotopic cluster at m/z 355 (M+H)$^+$.

Stage c p-Aminophenylsulphatoethylsulphone was diazotised as described in Example 1, Stage b, and coupled onto the product from Stage b of the present example. The title product was obtained as an orange solid.

The title product (0.1 parts) was dissolved in water (50 parts) at 25° C., pH 7.5 and cotton was added. The temperature was raised to 95° C. over 0.5 hour and maintained for 1 hour. The cotton was removed, rinsed in cold water to give a bright orange dyeing with very good wet-fastness.

EXAMPLE 26

Preparation of

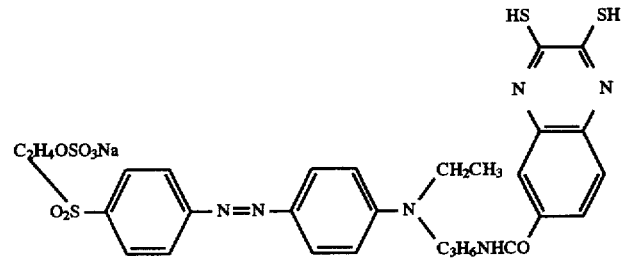

The method of Example 25 was repeated in essence except that in place of tetrachloropyrimidine there was used 2,3-dichloroquinoxalinyl chloride. The title product was obtained as an orange solid.

The title product (0.1 parts) was dissolved in water (50 parts) at 22° C., pH 6.5 and cotton was added. Na$_2$CO$_3$ (1 part) and salt (0.5 parts) were added. The temperature was raised to 50° C. over 0.5 hour and maintained for 1 hour. The cotton was removed, rinsed in cold water to give a bright orange dyeing with very good wet-fastness.

EXAMPLES 27–35

The method of Example 25 may be repeated in essence except that in place of tetrachloropyrimidine there is used the compound indicated in the second column.

| Example | Second Column |
| --- | --- |
| 27 | pentachloropyridine |
| 28 | 2,4,6-trifluoro-5-chloropyrimidine |
| 29 | cyanuric fluoride |
| 30 | tetrachloropyridazine |
| 31 | 3,6-dichloropyridazin-4-carboxylic acid chloride |
| 32 | 2,4,6-trichloropyrimidine |
| 33 | 2,3-dichloro-4-methyl-pyrimidinyl-5-carboxylic acid chloride |
| 34 | 2-chloro-4-methylthiazole-5-carboxylic acid chloride |
| 35 | 3,5-dichloroisothiazole-4-carboxylic acid chloride |

EXAMPLE 36

Preparation of

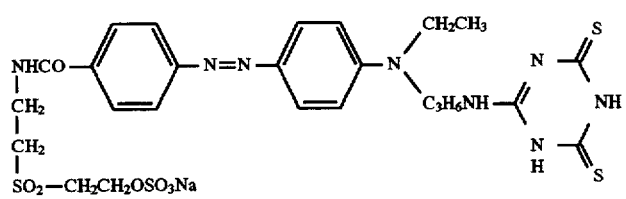

Stage a

To a stirred solution of p-nitrobenzoyl chloride (3.7 g, 0.02 mol) in dichloromethane (50 ml), cooled in ice, was added a solution of aminoethylthioethanol (2.4 g), triethylamine (2.02 g) and dichloromethane (50 ml). The reaction was stirred at room temperature for 14 hours, washed with water, dried (MgSO4) and evaporated to give an oil (4.7 g).

Stage b—Oxidation

Peracetic acid (38%, 7.3 ml) was added dropwise to a solution of the product from Stage a (4.5 g) in acetic acid (10 ml) at <5° C. The mixture was stirred for 1 hour then allowed to warm to room temperature overnight. The solution was evaporated to give an oil, which on trituration with dichloromethane gave a white solid (2.5 g).

Stage c—Reduction

The product from Stage b (2.5 g) was added to a stirred slurry of iron powder (2.5 g), ammonium chloride (2.5 g) in water (10 ml) and ethanol (60 ml). The mixture was heated under reflux for 1 hour, potassium carbonate added to remove soluble iron, the mixture was filtered and the filtrate evaporated to give an oily solid. The oily solid was dissolved in ethanol (60 ml), filtered and solvent evaporated from the filtrate to give a pale white solid (2.4 g). This solid was identified as aniline having a substituent of formula —CONHCH$_2$CH$_2$SO$_2$—CH$_2$H$_2$OH at the 4-position.

Stage d—Coupling

The method of Example 6 was followed except that in place of p-amino-phenylthiosulphatoethylsulphone there was used the product from Stage c of the present example.

Stage e—Sulphation

The product from Stage d above (2 g) was added to conc H$_2$SO$_4$ (100 ml) at 0° C. and allowed to warm to 20° C. overnight. The solution was added slowly to ice water at 0° C. to give a precipitate which was filtered-off and dried to give the title product (0.6 g). FAM mass spectrum showed an m/z at 683(M-H)$^-$.

Dyeing

The title product (0.2 parts) was dissolved in water (50 parts) at 24° C., pH 7.0 and cotton was added. Salt (1 part) was added and after 15 minutes Na$_2$CO$_3$ (1 part) was added. The temperature was raised to 60° C. over 0.5 hour and maintained for 1 hour. The cotton was removed, rinsed in cold water to give a bright yellow dyeing with very good exhaustion.

EXAMPLE 37

Preparation of

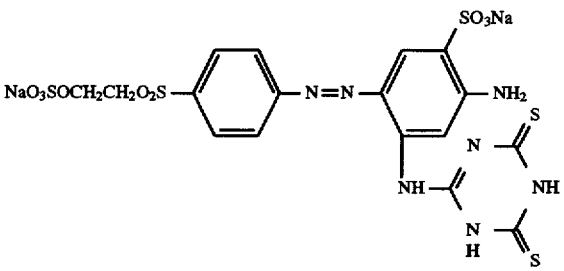

Stage a

A solution of sodium sulphide (13 g) in water (50 ml) was adjusted to pH 8 using 2N hydrochloric acid. The solution was cooled to 10° C. and a solution of 2-(3-amino-4-sulpho) anilino-4,6-dichloro-s-triazine (4.4 g) in acetone (40 ml) was added and the reaction stirred for 16 hours. Acidification with hydrochloric acid gave a solid (3.74 g) which was isolated by filtration. Mass spectral analysis showed an isotopic cluster at m/z 331.

Stage b—Coupling p-Aminophenylsulphatoethylsulphone was diazotised as described in Example 1, Stage b, and added to a solution of the product from Stage a of the present example at 0°-5° C., pH 4. The title product was isolated as a yellow solid by adding KCl.

The product was applied to cotton by exhaust dyeing and gave a high level of exhaustion.

EXAMPLE 38

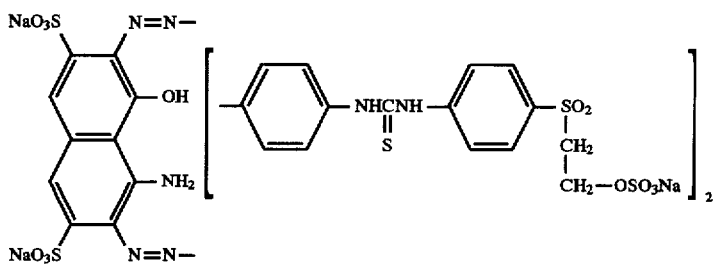

To 1-amino-2,7-bis(4'-aminophenylazo)-8-naphthol-3,6-disulphonic acid (46 g) in water (1000 ml) was added a suspension of 4-(β-sulphatoethylsulphonyl)phenyl isothiocyanate (2.2 molar equivalents) in water (50 ml) and acetone (225 ml) at pH 6.8. After 3 hours at 20° C. the mixture was filtered, to remove unwanted solids, and saturated potassium acetate (250 ml) added to the filtrate. The resultant solid was collected by filtration and washed with methanol to give the title product (56.6 g).

To the title product (0.2 g) in water (50 ml) was added cotton (5 g) followed by salt (2.5 g) of sodium bicarbonate (1 g). The temperature was raised to 90° C. over 1 hour to dye the cotton a deep bottle green shade.

EXAMPLE 39

The method of Example 38 was repeated except that in place of 4-(2'-sulphatoethylsulphonyl)phenylisothiocyanate there was used 2-sulpho-4-(2'-sulphatoethylsulphonyl)phenylisothiocyanate.

The product was obtained as a green solid.

EXAMPLE 40

Preparation of

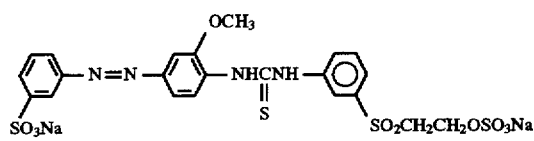

Thiophosgene (33 g) was added over 5 minutes to a solution of 3-aminophenylsulphatoethylsulphone (65 g) in water (800 ml) at pH 6.5. The solution was slowly basified to pH 6.5 using 2M $Na_2CO_3$. After stirring for 2 hours 10% w/v salt solution was added to precipitate a solid which was filtered-off, washed and dried to give a solid (68 g).

The solid (4.6 g) was dissolved in water (100 ml) and 4-amino-3-methoxy-3'-sulphoazobenzene (3.1 g) in water-:tetrahydrofuran (200 ml:10 ml) was added. After stirring at pH 6.3 for 7 hours NaCl solution (20% w/v) was added and the title product (8.4 g) filtered off and dried. $^1$H-NMR and a mass spectrum confirmed the above structure.

The title product (0.1 parts) was mixed with water (50 parts) at 20° C., pH 11 and cotton was added. The temperature was raised to 95° C. over 0.5 hour and maintained for 1 hour. The cotton was removed, rinsed in cold water to give a bright yellow dyeing with very good exhaustion.

EXAMPLE 41

The method of Example 40 was repeated except that in place of 4-amino-3-methoxy-3'-sulphobenzene there was used 4-amino-3-methoxy-3'-carboxybenzene.

EXAMPLE 42

Preparation of

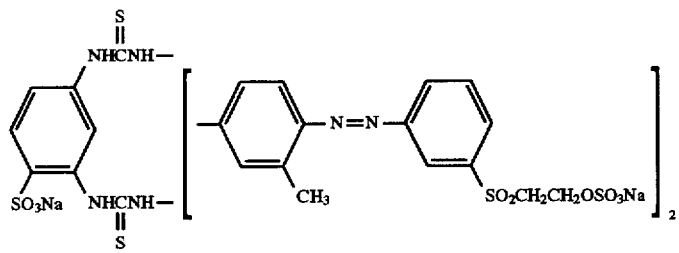

Stage a—Coupling

A cold solution of 3-aminophenylsulphatoethylsulphone (14.1 g) and 2M sodium nitrite (28 ml) in water (200 ml) at pH 6.5 was added slowly to a mixture of ice and concentrated HCl (15 ml) at 0° C. After stirring at 0° C. for 2 hours excess nitrous acid was destroyed by the addition of sulphamic acid. Meta-toluidine (5.5 g) in ethanol (75 ml) was added slowly, keeping the temperature below 5° C., and the pH was adjusted to pH 3.5. The mixture was stirred at 0°–5° C. for 4 hours, then allowed to warm to 20° C. overnight. The precipitate was filtered-off, washed and dried to give an azo compound (13.2 g).

Stage b

Meta-phenylenediamine-4-sulphonic acid (1.9 g) was dissolved in water (100 ml) at pH 7 and thiophosgene (4.6 g) added rapidly with vigorous stirring. The pH was adjusted to pH 7, stirred for 20 minutes, salt (10 g) added and the resultant di-isothiocyanate filtered-off and dried (2.9 g).

Stage c

The product from Stage a (5 g) was dissolved in water-:tetrahydrofuran (250 ml, 1:1) at pH 6.5. The product from Stage b (1.8 g) was added and the mixture stirred for 2 days. 10% w/v salt solution was added and the title product filtered-off and dried (5.3 g).

EXAMPLE 43

Preparation of

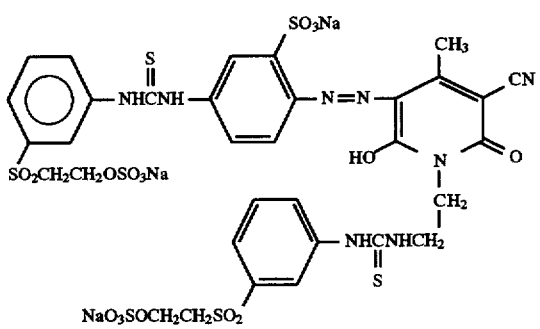

Stage a—Pyridone

Ethylene diamine (216 g) was added to water (130 ml) at below 40° C., using a water bath as coolant. Ethyl cyanoacetate (75.4 g) was added, followed by ethyl acetoacetate (87 g), maintaining the temperature below 40° C. The mixture was heated at 85° C. for 12 hours, then solvent evaporated under reduced pressure. The resultant oil was poured onto ice (700 g), and the solution adjusted to pH 7 with concentrated hydrochloric acid. The precipitate was filtered off, washed with water and dried (83 g).

Stage b—Coupling Component

The product from Stage a (13.3 g) was stirred in water (200 ml) at pH 6.8, 40° C., and m-aminophenylsulphatoethylsulphone isothiocyanate (20 g) was added over 30 minutes and the reaction mixture was stirred for a further 4 hours. The solution was evaporated under reduced pressure to give a tacky solid. This was triturated with ethanol, filtered, stirred with a further ethanol (200 ml) and finally refiltered to give the coupling component (26 g).

Stage c—Diazo Component p-Phenylenediamine sulphonic acid (10.9 g) was dissolved in water (250 ml) at pH 6.8, m-aminophenylsulphatoethylsulphone isothiocyanate (20.4 g) was added, and the mixture stirred for 3 hours. The solvent was removed under reduced pressure to give a thiourea as a brown solid (33 g).

Stage d—Coupling

The product from Stage c (14.4 g) was dissolved in water (250 ml) and concentrated hydrochloric acid (25 ml) at 0° C. 2M sodium nitrite (12 ml) was added, and the solution was stirred for 30 minutes. After destroying excess nitrous acid with sulphamic acid the solution was added to an ice-cooled solution of the product from Stage b (13.2 g) in water (200 ml) at pH 6.8. The reaction mixture was stirred at 0°-5° C. and pH 6.5 for 2 hours. The dye was isolated by adding 20% w/v salt solution, filtering and washing with a small mount of 20% brine to give the title product (16 g).

The title product (0.1 parts) was mixed with water (50 parts) at 28° C., pH 8 and cotton was added. Salt (1 part) and Na$_2$CO$_3$ (1 part) were added. The temperature was raised to 90° C. over 45 minutes and maintained for 45 minutes. The cotton was removed, rinsed in cold water to give a bright orange dyeing with very good exhaustion.

EXAMPLE 44

Preparation of

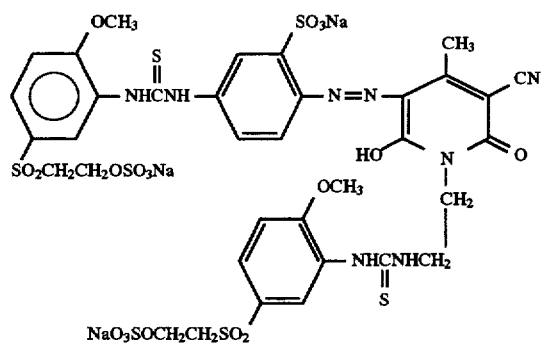

The method of Example 43 was followed except that in place of m-Aminophenylsulphatoethylsulphone isothiocyanate there was used 4-methoxy-3-aminophenylsulphatoethylsulphone isothiocyanate.

The title product (0.1 parts) was dissolved in water (50 parts) at 30° C., pH 8.5 and cotton was added. Salt (1 part) was added and after 30 minutes Na$_2$CO$_3$ (1 part) was added. The temperature was raised to 95° C. over ½ hour and maintained for 1 hour. The cotton was removed, rinsed in cold water to give a bright orange dyeing with very good exhaustion.

EXAMPLE 45

Preparation of

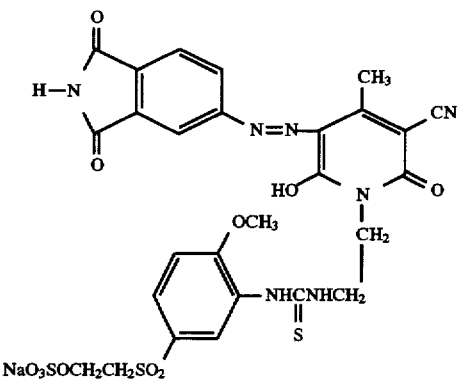

The method of Example 43 was followed except that in Stage b, 4-methoxy-3-aminophenylsulphatoethylsulphone isothiocyanate was used in place of m-aminophenylsulphatoethylsulphone isothiocyanate and in Stage d, 4-aminophthalimide was used in place of the product from Stage c. The title product was obtained as a yellow solid and the mass spectrum showed an m/z at 719 as expected.

The title dye was applied to cotton by exhaust dyeing and was completely exhausted from the dyebath.

EXAMPLE 46

Preparation of

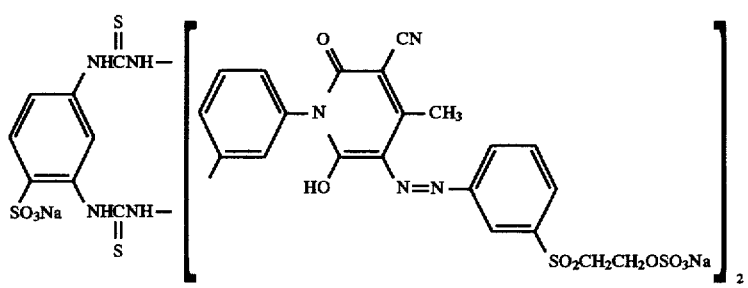

m-Aminophenylsulphatoethylsulphone (1.3 g) was stirred in water (50 ml) with 2M sodium nitrite (2.9 ml) at pH 6.5 and 0°-5° C. This solution was poured onto a mixture of concentrated hydrochloric acid (2 ml) and ice, keeping the temperature below 5° C., and stirred for 2 hours. The excess nitrous acid was destroyed with sulphamic acid, and the solution was then added to a solution of N-(m-aminophenyl)-3-cyano-6-hydroxy-4-methylpyridin-2-one in water (50 ml) at 0°–5° C. and pH 6.5. After stirring under these conditions for 2 hours, salt solution (10% w/v) was added to give a gelatinous precipitate. The mixture was adjusted to pH 4, cooled and filtered, and finally the product was dried (2.0 g).

m-Phenylenediamine sulphonic acid diisothiocyanate (0.26 g) was added to a solution of the above dyebase (1.0 g) in a mixture of water (25 ml) and THF (25 ml) at pH 6.5. The mixture was stirred for 48 hours. Salt solution (10% w/v) was added, and the product was filtered off, washed with a little 20% salt solution and dried (1.4 g).

EXAMPLES 47–55

The method of Example 1 may be repeated except that in place of p-aminophenylsulphatoethylsulphone there is used an aniline compound having a substituent described in Table A below:

EXAMPLE 57

The method of Example 38 was repeated except that in place of 1-amino-2,7-bis(4'-aminophenylazo)-8-naphthol-3,6-disulphonic acid there was used 1-amino-2-(4'-aminophenylazo)-7-(4'-N-ethyl-N-methylphenylazo)-8-naphthol-3,6-disulphonic acid.

EXAMPLE 58

The dyes described in Examples 1, 10, 11, 14, 38, 56 and 57 were applied to wet full chrome leather, retanned side leather, suede, nappa sheepskin (full grain) and vegetable tanned leather and heated at acid pH. The dyes exhausted from the dyebath and penetrated the leather well.

EXAMPLE 59–95

Further dyes were prepared by condensation of dyebases having an —$NH_2$ group with appropriate isothiocyanates or by azo coupling to give the dyes shown in the following table.

TABLE A

| Example | Position of Substituent | Substituent |
|---|---|---|
| 47 | 3 | —N($CH_3$)$SO_2CH_2CH_2OSO_3$Li |
| 48 | 3 | —N($CH_3$)$CH_2CH_2OSO_3$Na |
| 49 | 3 | —NH$C_2H_4$O$C_2H_4SO_2CH$=$CH_2$ |
| 50 | 3 | —NH$C_2H_4$O$C_2H_4SO_2CH_2CH_2OSO_3$Na |
| 51 | 4 | —CO—$CH_2CH_2SO_2CH$=$CH_2$ |
| 52 | 4 | —CO—$CH_2CH_2SO_2CH_2CH_2OSO_3$K |
| 53 | 3 | —NH$CH_2CH_2$—$SO_2CH$=$CH_2$ |
| 54 | 3 | —NH—C$_6$H$_4$—CONH$C_2H_4SO_2CH$=$CH_2$ |
| 55 | 3 | —NH—C$_6$H$_4$—O$CH_2$CONH$C_2H_4SO_2C_2H_4OSO_3$Na |

EXAMPLE 56

Preparation of

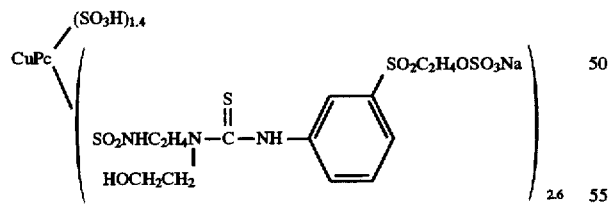

The method of Example 43, Stage b, was followed except that in place of the product from Example 43, Stage a there was used CuPc $(SO_3H)_{1.4}(SO_2HNC_2H_4NHCH_2CH_2OH)_{2.6}$ to give the title compound as a dark blue solid.

| Example | Structure | Shade |
|---|---|---|
| 59 | 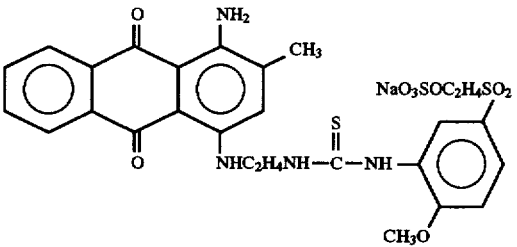 | Magenta |
| 60 | 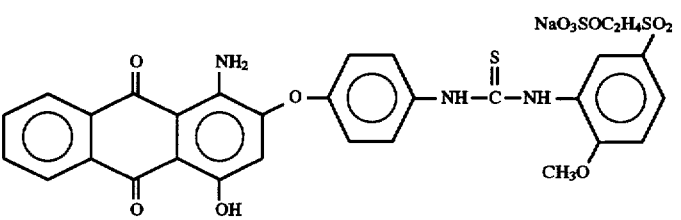 | Bluish-red |
| 61 | 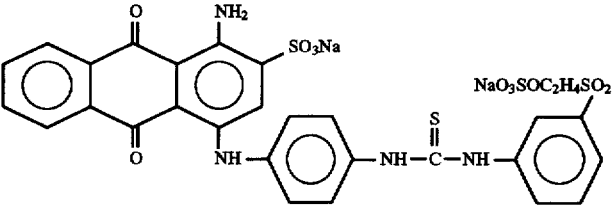 | Blue |
| 62 | 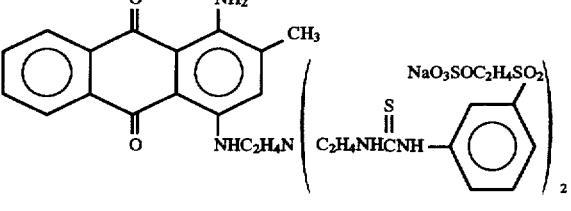 | Magenta |
| 63 | 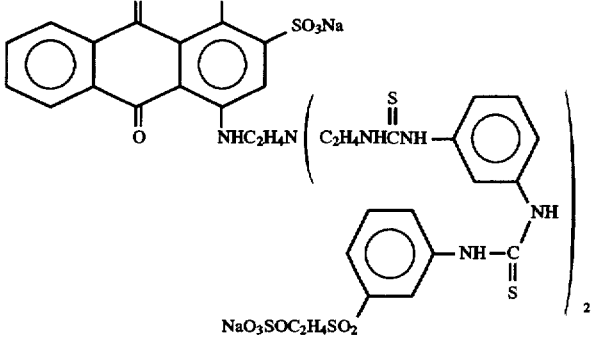 | Blue |
| 64 | 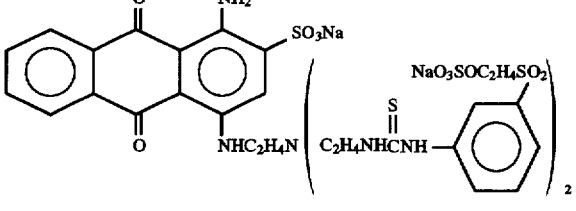 | Reddish-Blue |

| Example | Structure | Shade |
|---------|-----------|-------|
| 65 | | Reddish-Blue |
| 66 | | Reddish-Blue |
| 67 | | Blue |
| 68 | | Blue |
| 69 | | Turquoise |

-continued

| Example | Structure | Shade |
|---------|-----------|-------|
| 70 | CuPc(3SO₃Na)₁.₄ → (3SO₂NHC₂H₄NH—C(=S)—NH—[phenyl with NaO₃SOC₂H₄SO₂ and OCH₃, with C₂H₄OH on central C])₂.₆ | Turquoise |
| 71 | CuPc(3SO₃Na)₂.₅(3SO₂NHC₂H₄NHCNH(=S)—[phenyl]—SO₂C₂H₄OSO₃Na)₁.₅ | Turquoise |
| 72 | CuPc[(3SO₃Na)₂.₅ / (3SO₂NHC₂H₄NHCNH(=S)—[phenyl]—NHCNH(=S)—[phenyl with NaO₃SOC₂H₄SO₂])₁.₅] | Turquoise |
| 73 | CH₃O—[phenyl]—N=N—[naphthol with OH, SO₃Na]—NHCNH(=S)—[phenyl with NaO₃SOC₂H₄SO₂] | Scarlet |
| 74 | C₂H₄O₂S(OSO₃Na)—[phenyl]—N=N—[naphthol with OH, SO₃Na]—NHCNH(=S)—[phenyl with NaO₃SOC₂H₄SO₂ and OCH₃] | Orange |
| 75 | X—[phenyl]—N=N—[naphthol with OH, SO₃Na]—NHCNH(=S)—[phenyl with NaO₃SOC₂H₄SO₂ and OCH₃]; X = NH—C(=S)—NH—[phenyl with SO₂C₂H₄OSO₃Na] | Dull Red |
| 76 | CH₃O—[phenyl]—N=N—[naphthol with OH, SO₃Na]—NHCNH(=S)—[phenyl with NaO₃SOC₂H₄SO₂ and CH₃O] | Scarlet |

-continued
| Example | Structure | Shade |
|---|---|---|
| 77 | 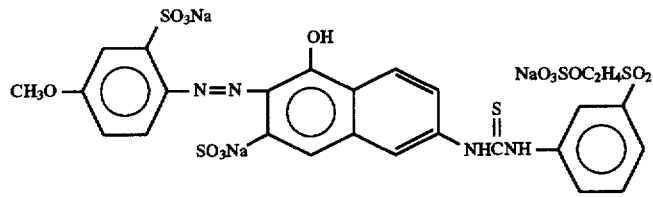 | Scarlet |
| 78 | 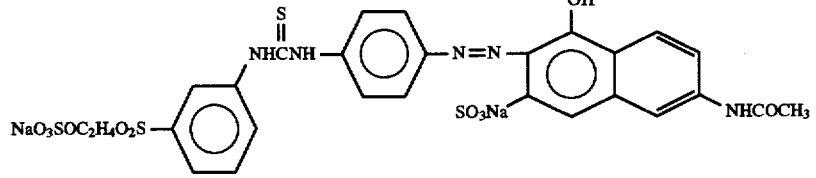 | Dull Red |
| 79 | 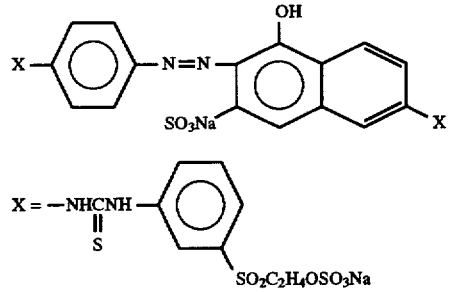 | Dull Red |
| 80 | 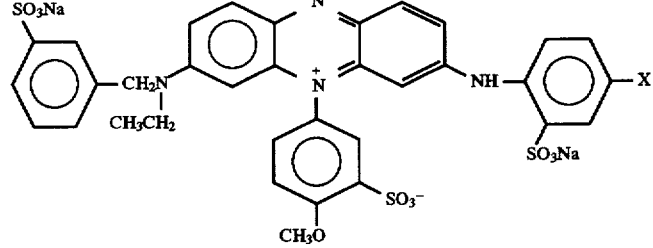 | Reddish-Blue |
| 81 | 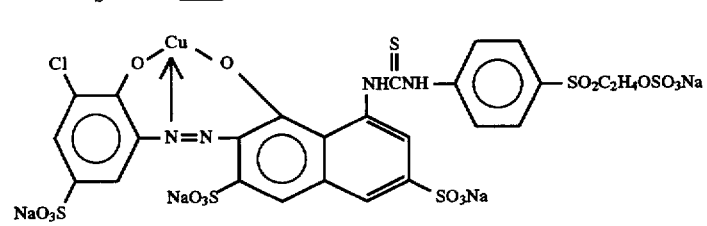 | Reddish-Navy |
| 82 | 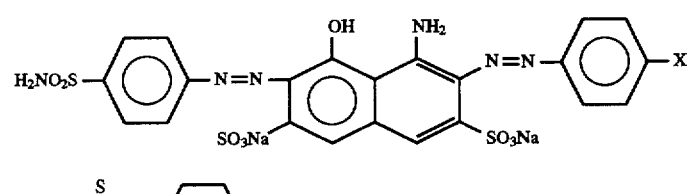 | Dull Green |

-continued

| Example | Structure | Shade |
|---|---|---|
| 83 | (structure) | Red |
| 84 | (structure) | Red |
| 85 | (structure) | Red |
| 86 | (structure), X = —CSNH-(4-OCH₃, 3-SO₂C₂H₄OSO₃Na phenyl) | Mid Red |
| 87 | (structure), X = triazine with Cl and NHNHCSNH₂ substituents | Red |

-continued

| Example | Structure | Shade |
|---|---|---|
| 88 | (naphthalene-SO₃Na)-N=N-(naphthol with OH, SO₃Na, SO₃Na, NHCSNH-(C₆H₃(OCH₃)(X))); X = —SO₂C₂H₄OSO₃Na | Bluish-Red |
| 89 | (naphthalene-SO₃Na)-N=N-(naphthol with OH, SO₃Na, NHCSNH-C₆H₄-X); X = —SO₂C₂H₄OSO₃Na | Bluish-Red |
| 90 | NaO₃S-OC₂H₄O₂S-C₆H₄-N=N-C₆H₄-N(CH₂CH₃)(C₂H₄SH) | Orange |
| 91 | NaO₃SOC₂H₄NHSO₂-C₆H₃(Cl)-N=N-C₆H₄-N(CH₂CH₃)(C₂H₄SH) | Orange |
| 92 | NaO₃SOC₂H₄NHSO₂-C₆H₃(Cl)-N=N-C₆H₄-N(CH₂CH₃)(C₃H₆NHC(=S)NH₂) | Orange |
| 93 | NaO₃SOC₂H₄NHSO₂-C₆H₃(Cl)-N=N-C₆H₄-N(C₃H₆NHC(=S)NH₂)₂ | Orange |
| 94 | NaO₃SOC₂H₄NHSO₂-C₆H₃(Cl)-N=N-C₆H₄-N(CH₂CH₃)(C₃H₆NH₂) | Orange |
| 95 | HNO₂S(C₂H₄OSO₃Na)-C₆H₄-N=N-C₆H₄-N(C₃H₆NH₂)₂ | Orange |

EXAMPLES 96–108

Further dyes which may be prepared in an analogous manner are shown in the following tables.

| Example | Structure | Shade |
|---|---|---|
| 96 | | Yellow |
| 97 | | Yellow |
| 98 | | Greenish-Yellow |
| 99 | | Orange |
| 100 | | Blue |

-continued
| Example | Structure | Shade |
|---------|-----------|-------|
| 101 | 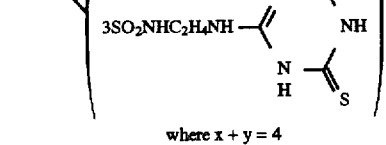 where x + y = 4 | Turquoise |
| 102 |  | Yellow |
| 103 | 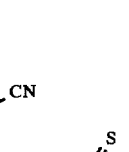 | Yellow |
| 104 | 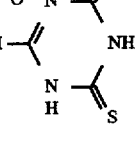 | Orange |
| 105 |  | Red |

-continued

| Example | Structure | Shade |
|---------|-----------|-------|
| 106 | | Red |
| 107 | | Orange |
| 108 | 2:1 Cr complex | Blue |
| 109 | X = —C(=S)—NH—C₆H₄—SO₂C₂H₄OSO₃Na | Red |
| 110 | X = —NH—C(=N)—NH—C(=S)—NH—CH(N-H)—C(=S) (thiotriazine) | Red |

-continued
| Example | Structure | Shade |
|---------|-----------|-------|
| 111 | 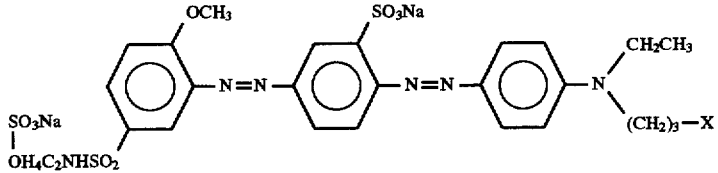 | Red |
| 112 | 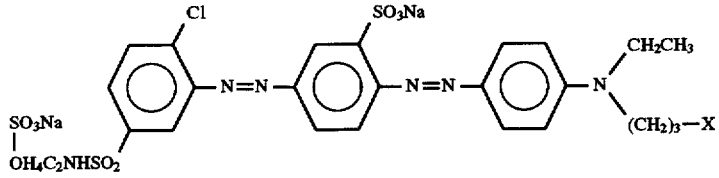 | Red |
| 113 | 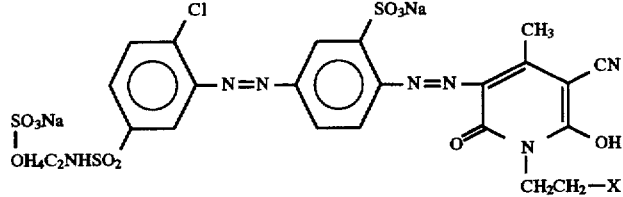 | Orange |
| 114 | 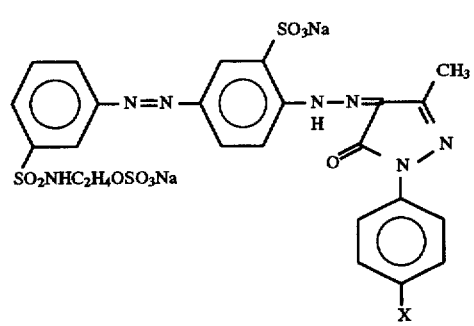 | Orange |

| Example | Structure | Shade |
|---|---|---|
| 115 | 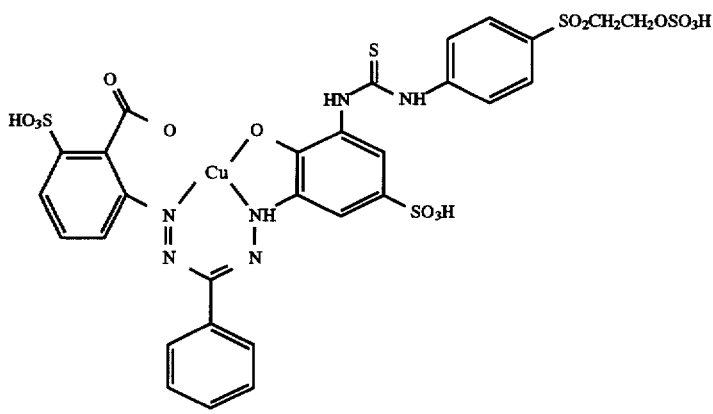 | Orange |

EXAMPLE 116

A mixture comprising the product of Example 22 (5 parts), water (100 parts), urea (20 parts) and Na$_2$CO$_3$ (2 parts) were applied to cotton by padding and dried for 1 minute. The cloth was heated at 165° C. for 1 minute then washed. The cotton was dyed an intense orange shade with excellent fixation. Washing of the dyed fabric in soap solution removed very little dye, showing excellent wash fastness.

EXAMPLE 117

Preparation of

Dyebase (46.9 g, strength 41.5%) was stirred in water (1000 ml) at pH 7. A slurry of 4-(β'-sulphatoethylsulphonyl)-phenylisothiocyanate in acetone was added until no dyebase was detected by HPLC chromatography (approximately 1.6 mol equivalents). The pH was maintained between 6.5 and 7.0.

After about 3 hours the reaction mixture was screened and NaCl added to 30%. The precipitated solid was collected, washed with brine and dried to give the title product (86.9 g, strength 31%, yield 89%).

EXAMPLE 118

Stage a

The method of Example 3 was repeated except that in place of p-aminophenylsulphatoethylsulphone there was used 4-amino—N-(β-sulphatoethyl)benzenesulphonamide.

Stage b—Dyeing

A mixture comprising the product of Stage a (2 parts), water (100 parts), urea (20 parts) and Na$_2$CO$_3$ (2 parts) was applied to cotton by padding and the cotton was dried at 30° C. for 1 hour. The cloth was heated at 150° C. for 10 minutes then washed. The cotton was dyed an intense orange shade with excellent fixation and very good wash-fastness.

EXAMPLES 119–126

The method of Example 9 may be repeated except that in place of p-aminophenylsulphatoethylsulphone there is used the amines listed in column 2 below:

| Example | Column 2 |
|---------|----------|
| 119 | H₂N—⟨○⟩—CONHC₂H₄SO₂C₂H₄OSO₃Na |
| 120 | H₂N—⟨○⟩—CONHC₂H₄OC₂H₄SO₂C₂H₄OSO₃Na |
| 121 | H₂N—⟨○⟩—CONHC₂H₄OC₂H₄SO₂C₂H₄OSO₃Na |
| 122 | H₂N—⟨○⟩—CON(CH₂CH₂SO₂C₂H₄OSO₃Na)₂ |
| 123 | H₂N—⟨○⟩—CON(CH₂CH₂CH₂SO₂C₂H₄OSO₃Na)₂ |
| 124 | H₂N—⟨○⟩—CON⟨ ⟩N—C₂H₄SO₂C₂H₄OSO₃Na |
| 125 | H₂NC₂H₄NHC₂H₄SO₂C₂H₄OSO₃Na |
| 126 | H₂NCH₂CHCH₂SO₂C₂H₄OSO₃Na<br>         \|<br>         Cl |

We claim:

1. A solid water-soluble dye containing an electrophilic group and a nucleophilic group containing an —SH or ═S group, which dye when heated or basified or heated and basified causes the union of molecules of the dye by formation of a covalent bond between the electrophilic group of one molecule and the nucleophilic group of another molecule of the dye.

2. A water-soluble dye containing an electrophilic group and a nucleophilic group containing an —SH or ═S group, which dye when heated or basified or heated and basified causes the union of molecules of the dye by formation of a covalent bond between the electrophilic group of one molecule and the nucleophilic group of another molecule of the dye to give a product having less than 25% of the water-solubility of the original dye.

3. A solid water-soluble dye containing, as a nucleophilic group, an —SH or ═S group and additionally containing an electrophilic group, whereby when the dye is heated or basified or heated and basified said —SH or =S group allows formation of a covalent bond between the nucleophilic group of one molecule of the dye and the electrophilic group of another molecule of the dye so as to cause the union of said molecules of the dye.

4. A water-soluble dye containing, as a nucleophilic group, an —SH or ═S group and additionally containing an electrophilic group, whereby when the dye is heated or basified or heated and basified said —SH or ═S groups allows formation of a covalent bond between the nucleophilic group of one molecule of the dye and the electrophilic group of another molecule of the dye so as to cause the union of said molecules of the dye to give a product having less than 25% of the water-solubility of the original dye.

5. A dye according to claim 1 or 2 wherein said —SH or ═S group is provided by a thiourea.

6. A dye according to claim 1 or 2 wherein the —SH or ═S group is attached to a heterocyclic ring.

7. A dye according to claim 1 or 2 wherein the number of nucleophilic groups is different from the number of electrophilic groups.

8. A dye according to claim 1 or 2 wherein substantially all of the molecules unite when the dye is basified.

9. A water-soluble dye which contains a nucleophilic group and an electrophilic group wherein:

(i) the nucleophilic group is selected from —SH and ═S;

(ii) the electrophilic group is an activated alkene or a group capable of undergoing an elimination and addition reaction; and (iii) any sulpho groups in the dye are removable by heating or basifying the dye.

10. A dye according to claim 9 wherein the electrophilic group is a group of formula —Z¹—CR⁷═CR⁸R⁹, —CR⁷═CR⁹—Z², —CZ²═CR⁷R⁹, —NR⁵—Z¹—CR⁷═CR⁸R⁹, —Z¹—NR⁵—(CR¹¹R¹¹)ₘ—X², —NR⁵—Z¹—(CR¹¹R¹¹)ₘ—X², or —Z¹—(CHR¹¹)ₘ—X² wherein Z¹ is —SO—, —SO₂— or —CO— and Z² is —CN, —NO₂, or an alkyl- or aryl sulphonyl group or an acyl group; R⁷, R⁸ and R⁹ are each independently H, C₁₋₄-alkyl or halo; R⁵ is H phenyl or C₁₋₄-alkyl; each R¹¹ independently is halo, —NH₂, carboxy or a group described above for R⁵; X² is —OSO₃H, —SSO₃H, —PO₃H₂, or a salt thereof, halo or acetoxy; and m is 2, 3 or 4.

11. A dye according to claim 9 or 10 wherein said —SH or ═S group is provided by a heterocyclic thiol or a heterocyclic thione.

12. A dye according to claim 9 or 10 wherein said —SH or ═S group is provided by a thiourea.

13. A dye according to claim 11 wherein the heterocyclic thiol or heterocyclic thione are of the Formula (1) or (2) or a salt thereof:

(1)

(2)

14. A polymer or oligomer obtainable by heating or basifying a dye according to claim 1.

15. A polymer or oligomer according to claim 14 which is free from sulpho groups.

16. A polymer or oligomer according to claim 14 which has less than 1% of the solubility of the original dye in water at 20° C.

17. A water-soluble dye according to claim 3 or 4 wherein the electrophilic group is of the formula:

—Z¹—CR⁷═CR⁸R⁹,

—CR⁷═CR⁹—Z²,

—CZ²═CR⁷R⁹,

—Z¹—NR⁵—(CR¹¹R¹¹)ₘ—X², or $-Z^1-(CHR^{11})_m-X^2$, wherein:

$Z^1$ is —SO—, —SO$_2$— or —CO—;

$Z^2$ is —CH, —NO$_2$, or an alkyl- or aryl sulphonyl group or and acyl group;

$R^5$ is H, C$_{1-4}$-alkyl or phenyl;

$R^7$, $R^8$ and $R^9$ are each independently H, C$_{1-4}$-alkyl or halo;

each $R^{11}$ independently is halo, —NH$_2$, carboxy, H, C$_{1-4}$-alkyl or phenyl; and m is 2, 3, 4.

18. A water-soluble dye according to claim 17 wherein $Z^2$ is —CN, —NO$_2$, —SO$_2$—(C$_{1-4}$-alkyl), phenylsulphonyl or tosyl.

* * * * *